(12) United States Patent
Ferrini et al.

(10) Patent No.: US 10,534,123 B2
(45) Date of Patent: Jan. 14, 2020

(54) WHITE LIGHT SOURCE

(71) Applicant: CSEM CENTRE SUISSE D'ELECTRONIQUE ET DE MICROTECHNIQUE SA—RECHERCHE ET DÉVELOPPEMENT, Neuchâtel (CH)

(72) Inventors: Rolando Ferrini, Bern (CH); Oscar Fernandez, Pratteln (CH); Guillaume Basset, Huningue (FR)

(73) Assignee: CSEM CENTRE SUISSE D'ELECTRONIQUE ET DE MICROTECHNIQUE SA—RECHERCHE ET DÉVELOPPEMENT, Neuchâtel (CH)

( * ) Notice: Subject to any disclaimer, the term of this patent is extended or adjusted under 35 U.S.C. 154(b) by 167 days.

(21) Appl. No.: 15/549,373

(22) PCT Filed: Feb. 10, 2015

(86) PCT No.: PCT/EP2015/052797
§ 371 (c)(1),
(2) Date: Aug. 7, 2017

(87) PCT Pub. No.: WO2016/128031
PCT Pub. Date: Aug. 18, 2016

(65) Prior Publication Data
US 2018/0031752 A1   Feb. 1, 2018

(51) Int. Cl.
*F21V 8/00* (2006.01)

(52) U.S. Cl.
CPC ........... *G02B 6/0016* (2013.01); *G02B 6/005* (2013.01); *G02B 6/0018* (2013.01);
(Continued)

(58) Field of Classification Search
CPC .... G02B 6/0016; G02B 6/0018; G02B 6/005; G02B 6/0036; G02B 6/0063;
(Continued)

(56) References Cited

U.S. PATENT DOCUMENTS 7,690,810 B2 * 4/2010 Saitoh .................... G02B 5/045
362/244
8,109,644 B2 * 2/2012 Bierhuizen .......... G02B 6/0018
362/249.02
(Continued)

FOREIGN PATENT DOCUMENTS

| EP | 2 447 746 A1 | 5/2012 |
| WO | 2008/139353 A1 | 11/2008 |
| WO | 2014/108595 A1 | 7/2014 |

OTHER PUBLICATIONS

International Preliminary Report on Patentability dated Aug. 15, 2017, issued in corresponding International Application No. PCT/EP2015/052797, filed Feb. 10, 2015, 1 page.
(Continued)

*Primary Examiner* — William N Harris
(74) *Attorney, Agent, or Firm* — Christensen O'Connor Johnson Kindness PLLC

(57) ABSTRACT

A white light source includes an array of light emitting elements arranged to a light guide.
A light in-coupling array is arranged so that each light emitting element faces a light in-coupling element to incouple in the light guide a portion of the divergent light beams so that the in-coupled angle of at least a part of the light rays of the in-coupled light beam is higher than 45°.
An array of light homogenizing elements is arranged so that each light homogenizing element faces a light incoupling element and so that the deflection angle of at least a fraction of the incident part of the in-coupled light beam incident on each of said homogenizing elements is higher than 45°.
(Continued)

The white light source provides a uniform outcoupled white light beam.

27 Claims, 10 Drawing Sheets

(52) U.S. Cl.
CPC ......... *G02B 6/0031* (2013.01); *G02B 6/0036* (2013.01); *G02B 6/0051* (2013.01); *G02B 6/0055* (2013.01); *G02B 6/0068* (2013.01); *G02B 6/0076* (2013.01); *G02B 6/0083* (2013.01)

(58) Field of Classification Search
CPC ............. G02B 6/0023; G02F 1/133603; G02F 1/133605; G02F 1/133606; G02F 2001/133607; G02F 1/133609; G02F 1/133611
See application file for complete search history.

(56) References Cited

U.S. PATENT DOCUMENTS

| | | | |
|---|---|---|---|
| 2007/0146298 A1 | 6/2007 | Kim | |
| 2008/0055931 A1* | 3/2008 | Verstraete | ............ G02B 6/0068 362/612 |
| 2010/0195315 A1* | 8/2010 | Ohkawa | ............... G02B 6/0016 362/97.1 |
| 2014/0029297 A1 | 1/2014 | Watabe et al. | |
| 2015/0212250 A1* | 7/2015 | Tai | ....................... G02B 6/0031 362/609 |

OTHER PUBLICATIONS

International Search Report dated Oct. 15, 2015, issued in corresponding International Application No. PCT/EP2015/052797, filed Feb. 10, 2015, 4 pages.

Written Opinion of the International Searching Authority dated Oct. 15, 2015, issued in corresponding International Application No. PCT/EP2015/052797, filed Feb. 10, 2015, 6 pages.

* cited by examiner

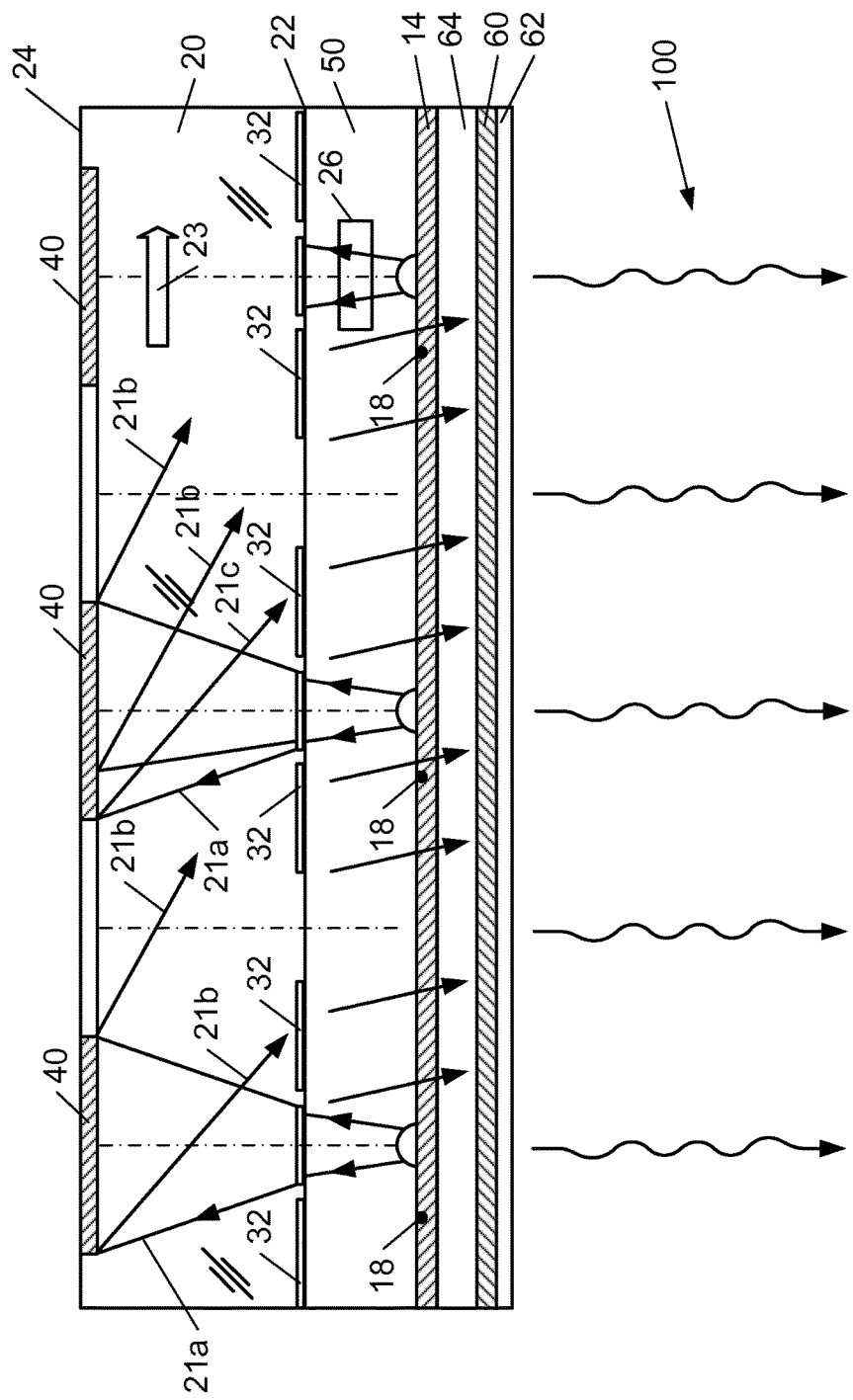

WHITE LIGHT SOURCE

The work leading to this invention has received funding from the European Union Seventh Framework Programme (FP7/2007-2013) under grant agreement No. 619556.

TECHNICAL FIELD

The invention relates to the field of light sources and illumination devices. The invention relates in particular to white light sources having a uniform intensity distribution, that include light directing films, for outdoor and indoor lighting applications.

BACKGROUND OF THE INVENTION

As of today, indoor and outdoor lighting is commonly based on fluorescent lamps, incandescent lamps and pressure lamps, while there is a general trend to use more and more modern light sources such as semiconductor light sources, in particular light emitting diodes (LED).

To enable interior light designers and architects to provide aesthetic white light sources there is an increasing demand for white light sources of which white light spectrum and intensity distribution can be adapted to the required lighting conditions and which also provide a great luminance uniformity of the emitted lighting or illumination characteristics of such light sources. Also, subtle shades of white of these light sources are required.

Conventional light sources have different drawbacks such as heat generation, the need for high voltages, high power consumption and minimum thickness of about 50 mm. When arranged in an array, such arrays may also be heavy and difficult to integrate aesthetically in, for example, the interior of a building. The possibility to design different shapes of the housings of such array is also quite limited and generally expensive.

Since the technology development of LEDs has grown exponentially in the last decade, there is a general trend to use more and more LEDs in lighting solutions. Colored LEDs, specifically blue and white LEDs are now commonly available and are constantly being improved. The performances of modern LEDs have reached extremely high standards such as very high efficiency and lumen output and a wide range of designs of LED's and LED arrays are available.

More particularly, white LED elements have become available by, for example, combining blue LEDs with fluorescent materials or by combining red, green and blue LED's In the field of white light illumination systems comprising an array of light sources, the main challenge is to provide high intensity and high efficiency lighting systems with uniform intensity distribution over the entire light emitting surface. While a number of designs may achieve high luminance intensity, they have a low hiding factor, meaning that the individual light emitting sources will not be completely hidden and will be perceived by the observer, which detrimentally impacts the device aesthetics. To solve this problem, a wide variety of light mixing arrangements have been proposed in the past. However these solutions are based on systems that have low light emitting efficiency. This general relation between the hiding factor and the light efficiency is shown in the graph of FIG. 1c: the higher the hiding factor, the lower the light emission efficiency. This trend is applicable to both conventional and LED-based light sources Another important requirement is the possible reduction in thickness of white light systems. LED arrays are particularly well suited since the individual LED elements, including the plastic housing, may be as small as 3 mm, and even smaller. LEDs are also particularly suited to be arranged in arrays.

In order to achieve a small thickness and an elevated hiding factor, a number of solutions have been proposed in the past that are based on the combination of LEDs and light guides to achieve a sufficient degree of mixing of light and hence to obtain improved viewing characteristics of the illumination devices, also called luminaires.

WO 2006/034831 discloses an example of a system in which the light guide comprises pyramid-shaped out-coupling faces to improve the distribution of the emitted light. The drawback of the light guide described in WO 2006/034831 is that the in-coupled light beam must be highly collimated in order to achieve high luminance intensity. Also, as the stability of the luminance intensity depends on the in-coupling system, it is difficult to assure a long term stability of the luminance intensity of the light source.

A common approach in the use of light waveguides consists in coupling the light beam provided by a light source through one edge of the waveguide. One example of a light source based on edge-coupling of the light source is disclosed in US 2001/0053075.

The main drawback of such a solution is that it requires a minimum thickness of the waveguide in order to collect a sufficient amount of light, and hence, acceptable in-coupling efficiency. Also, the emissive (typically rectangular) area increases quadratically with its length while the available surface of the edge only increases linearly. Thus, for a given required lumen output (i.e. the number of LEDs), the LED pitch decreases with increasing emissive area leading to an increase in the complexity of the illumination system as well as of the thermal dissipation. Also, in the edge-coupling approach, the design of the needed out-coupling structures, which must be compatible with a homogeneous luminance, depends strongly on the emitting area.

On the contrary, the back-coupling approach, as for example described in 2013/0272024 (embodiment of FIG. 4), has an in-plane periodicity of the elements of the light emitting array and the optimization of the light output of the emitting light array is limited to the optimization of the light emitting unit cells.

Another common solution to homogenize the light emitted by LEDs over large-areas uses diffusing plates with imbedded scattering particles in, for example, a backlight configuration. However, the hiding power of such plates increases as the distance between the LEDs and the diffuser and the thickness of the diffusing plate increase, but these two effects are not desired for thin lighting modules.

WO 2014/033576 discloses a combination of edge in-coupling and a light guide with embedded diffusing particles. This approach has the same limitations as those mentioned above for systems based on edge in-coupling and/or that for systems light scattering particles.

Another approach is to use materials with large hiding powers, but these solutions are associated with an efficiency drop as illustrated in FIG. 1.

Finally, LED densities may also be increased but this leads to an increase in cost and the need for far more complex heat management solutions.

SUMMARY OF THE INVENTION

An object of the present invention is to propose a new white light source to overcome, at least partially, the limitations of white light sources of the prior art. The white light source of the invention comprises an array of light emitting elements and has high light power efficiency and high luminance uniformity combined with a high hiding factor of the individual light emitting elements. This is achieved by arranging an optical waveguide facing the light emitting elements. The optical waveguide comprises a first surface and a second surface facing said first surface. Light in-coupling elements are arranged on said first surface and light homogenizing elements are arranged on said second surface. Said light homogenizing elements comprise light redirecting and out-coupling elements which allow to distribute the in-coupled light provided by the light in-coupling elements along the length of the waveguide and coupling the light out of the waveguide so that at least one very homogeneous white light beam is provided, at least to the side of the optical waveguide opposite to said light emitting elements.

The object of the invention is more precisely achieved by a white light source comprising at least a light emitting array comprising light emitting elements, each emitting a divergent substantially monochromatic light beam. Individual white light emitting elements are excluded from the invention. The light emitting elements may be different light emitting elements and may be arranged in different ways in said light emitting array. Said light emitting elements are arranged on a substrate that comprises at least one electrical conducting wire connecting at least said light emitting elements. Said substrate may be a highly reflecting substrate, either diffuse or specular, comprising at least a highly reflecting area facing said first surface, or may be a transparent substrate.

At least an array of light incoupling elements is arranged on said first surface of the light guide comprises, to the side of said substrate. Each of said light in-coupling elements faces one of the light emitting elements.

Said substrate is separated from said incoupling surface by at least a gap layer, which may be an air layer, which has an effective refractive index at least 0.2 lower than the refractive index of the light guide.

Each of said light in-coupling elements is arranged to couple in said light guide a portion of said divergent light beams, said portion defining an in-coupled light beam. Said light incoupling elements are further arranged so that the in-coupled angles of at least a part of the light rays of said in-coupled light beam are higher than 45°, preferably higher than 60°, so that total internal reflection is achieved by said part of light rays on said first surface, said incoupled angles being defined relative to the normal of said first surface. Said second surface faces said first surface and comprises at least an array of light homogenizing elements arranged on said second surface, each of said light homogenizing elements facing one of the light in-coupling elements. The light homogenizing elements are non-uniform structures that are arranged so that the deflection angle of at least a fraction of the incident part of said incoupled light beam incident on each of said light homogenizing elements is higher than 45°, preferably higher that 60°. Each of said light homogenizing elements comprises at least a light homogenizing portion and at least one outcoupling portion.

The white light source is arranged to provide at least one uniform out-coupled white light beam emitted to at least the side of said light guide opposite to said first surface.

Said substrate is a highly reflecting substrate, reflecting at least 80% of visible light, and comprising at least a highly reflecting area facing said first surface.

In an embodiment a front layer is arranged to said light guide and faces said second surface. Said front layer may comprise a wavelength up-conversion layer.

In an embodiment said wavelength up conversion layer is arranged inside said light guide and is in proximity to said second surface.

In an embodiment said substrate is a transparent substrate, and a front layer may be arranged to said substrate to the side opposite of said light guide and said front layer may comprise a wavelength up-conversion layer. In a variant wherein the substrate is a transparent substrate a wavelength up-conversion layer may be arranged inside said light guide and in proximity to said second surface.

In an embodiment a second light guide, comprising a third surface and a fourth surface facing said third surface, is arranged to said substrate to the side opposite to said first surface, said second light guide comprising a second in-coupling array comprising second in-coupling elements arranged on said third surface and comprising a second array of homogenizing elements comprising second homogenizing elements arranged on said fourth surface, each of said second homogenizing elements facing a second in-coupling element; In the embodiment comprising a second light guide said white light source is arranged to provide a second uniform white light beam emitted to the side of said second light guide opposite to said second in-coupling array. In an embodiment comprising a second light guide, a front layer is arranged to said second waveguide to the side opposite of said substrate, and said front layer may comprise a wavelength up-conversion layer.

In an embodiment comprising a second light a wavelength up-conversion layer is arranged inside said light guide and in proximity to said fourth surface.

In an embodiment the white light source comprises at least an array of light emitting elements emitting light in at least a portion of the wavelength spectrum between 200 nm-500 nm, preferably between 200-480 nm, and may comprise red and green light emitting elements, the light emitting elements emitting light in at least a portion of the wavelength spectrum between 200 nm-500 nm may emit more than 80% of the total optical power emitted by said array of light emitting elements.

In an embodiment said white light source may comprise means to tune the spectral composition of said white light beam.

In an embodiment the white light source comprises at least a first array of red light emitting diodes, a second array of green light emitting diodes and a third array of blue light emitting elements said first, second and third arrays being intertwined.

In an embodiment said front layer comprises at least a diffusing layer.

In an embodiment said front layer comprises a colored layer.

In an embodiment said front layer is a patterned layer comprising at east a plurality of structured patterns.

In an embodiment said light incoupling elements are diffractive grating in-coupling elements.

In an embodiment said diffractive grating incoupling elements comprise at least two different grating elements being substantially radially symmetric around the optical axis of each of said divergent light beams 12.

In an embodiment each of said grating in-coupling elements comprise homogenous pixels arranged in an array having a period smaller than 1000 nm, more preferable smaller than 850 nm and even more preferably smaller than 650 nm.

In an embodiment at least a portion of said grating in-coupling elements and/or at least a portion of said light homogenizing elements are coated with a thin layer of high refractive index, said thin layer having a thickness being less than 300 nm, said refractive index being higher than 1.65.

In an embodiment said light in-coupling elements are micro lens or micro prisms in-coupling elements. In an embodiment each of the light in-coupling elements comprises also grating elements. In an embodiment further light coupling elements are arranged between said light in-coupling elements. In an embodiment further light coupling elements are arranged between said light in-coupling elements.

In an embodiment further light coupling elements are arranged between said light in-coupling elements. In an embodiment, said light in-coupling elements may cover less than 50% of said first surface, preferable less than 25%, even more preferable less than 10%.

In an embodiment said light homogenizing elements are micro lens or micro prisms in-coupling elements.

In an embodiment said light homogenizing elements are non-uniform and have a substantially radially symmetric around the optical axis of each of said divergent light beams. In an embodiment each of the light homogenizing elements comprises also grating elements.

In an embodiment said light homogenizing elements are adjacent light homogenizing elements, and the total area of said light homogenizing elements may be greater than 60% of the area of said second surface, preferable greater than 80% of the area of said second surface. In an embodiment said light homogenizing elements are separated by separation areas.

In an embodiment said separation areas comprise diffractive structures and/or may comprise micro lens structures.

In an embodiment the total incoupled angle of the light rays of a central part of each of said divergent light beams on said light in-coupling elements is greater than for light rays of a peripheral part of the divergent light beam on said light in-coupling elements.

In an embodiment said central part is less than 50% of the total angular aperture of said divergent light beam, preferably less than 30%, more preferable less than 15% of the total aperture of said divergent light beam.

In an embodiment each of said light homogenizing elements is arranged to provide a greater deflection angle (δ) for incident light rays incident on a central part of said light homogenizing elements than for incident light rays incident on a peripheral part of said light homogenizing elements, said incident light rays being provided by said in-coupled light beam.

In an embodiment said central part is less than 50% of the surface of said light homogenizing elements, preferably less than 30%, more preferable less than 15% of the surface of said light homogenizing elements In an embodiment said light guide has a thickness between 0-5 mm, preferably between 0-2 mm, more preferably between 0-1 mm, even more preferably between 0-0.5 mm.

In an embodiment said gap layer has a thickness between 0-2 mm, preferably between 0-1 mm, more preferably between 0-0.5 mm, even more preferably between 0-0.25 mm, said thickness may be 0 mm.

In an embodiment said gap layer is an air layer comprising structural contacts, such as pillars, between the substrate and the waveguide, said structural contacts having a total cross sectional area defined in the plane of said second surface of preferably less than 5% of the area of said second surface.

In an embodiment said gap layer is a layer comprising a material having an effective refractive index between 1-1.7, preferably between 1.2-1.6, more preferably between 1.2-1.4.

In an embodiment said gap layer comprises beam shaping elements arranged between said light emitting elements and said light in-coupling elements.

In an embodiment light redirecting elements are arranged between adjacent divergent light beams. In an embodiment said light redirecting elements comprise scattering elements. In an embodiment said light redirecting elements comprise light reflecting elements. In an embodiment said light redirecting elements comprise light diffracting elements.

BRIEF DESCRIPTION OF THE DRAWINGS

The above described objects and advantages of the present invention will become more readily apparent to those ordinarily skilled in the art after reviewing the following detailed descriptions and accompanying drawings, in which:

FIG. 1b shows also a detailed view of the incoupling of light by a light incoupling element, and the deflection of some exemplary incident rays on a first light homogenizing element, comprising a central portion and a peripheral portion, and the outcoupling of a fraction of a guided light beam by the outcoupling portion of second light homogenizing element, said first and second light homogenizing elements being separated so that the guided light rays have undergone several total reflections between the first and second light homogenizing element;

FIG. 6 shows a lateral cross section of a white light source comprising a transparent substrate;

DETAILED DESCRIPTION

The present invention will now be described more fully hereinafter with reference to the accompanying drawings, in which the exemplifying embodiments of the present invention are shown. The present invention may, however, be embodied in many different forms and should not be construed as limited to the embodiments set forth herein; rather, these embodiments are provided by way of example so that this disclosure will convey the scope of the invention to those skilled in the art. Furthermore, like numbers refer to the same or similar elements or components throughout.

Figure 1A:
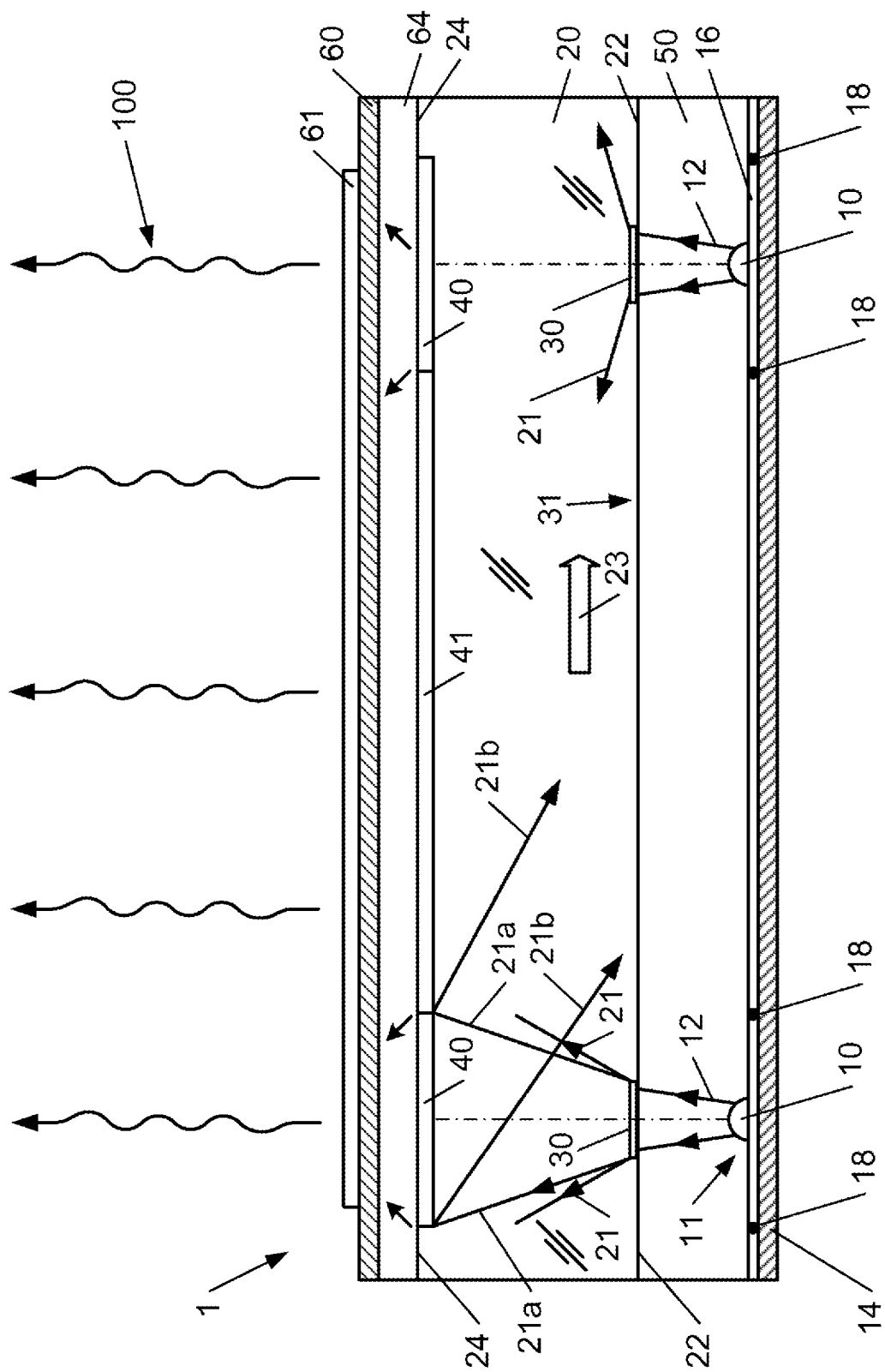
FIG. 1a illustrates a lateral cross section of a white light source comprising a reflecting substrate and a front layer.

FIG. 1a shows a preferred embodiment of the white light source 1 of invention comprising:

- an array 11 of blue light emitting elements 10 emitting each, when in operation, a divergent light beam 12, said array 11 being arranged on a reflecting substrate 14;
- at least two conducting wires 18 arranged to said substrate 14;
- a light guide 20, also defined as optical waveguide, or waveguide comprising at least a first surface 22, being defined as an in-coupling surface and a second surface 24, being defined as a homogenization surface and also defined as an out-coupling surface, said first surface 24 facing said second surface 22; the light guide 20 is preferably a thin flexible waveguide comprising at least two edges, also defined as side surfaces, linking said first surface 22 and said second surface 24;
- an array 30a of in-coupling elements 30 arranged on said first surface 22;
- an array of light homogenizing elements 40 arranged on said second surface 22; said light homogenizing elements comprise at least a light homogenizing portion 42 and at least an outcoupling portion 44;
- a front layer 60 arranged to said second surface 24, said front layer 60 comprising at least a wavelength up-conversion layer.

Figure 1B:
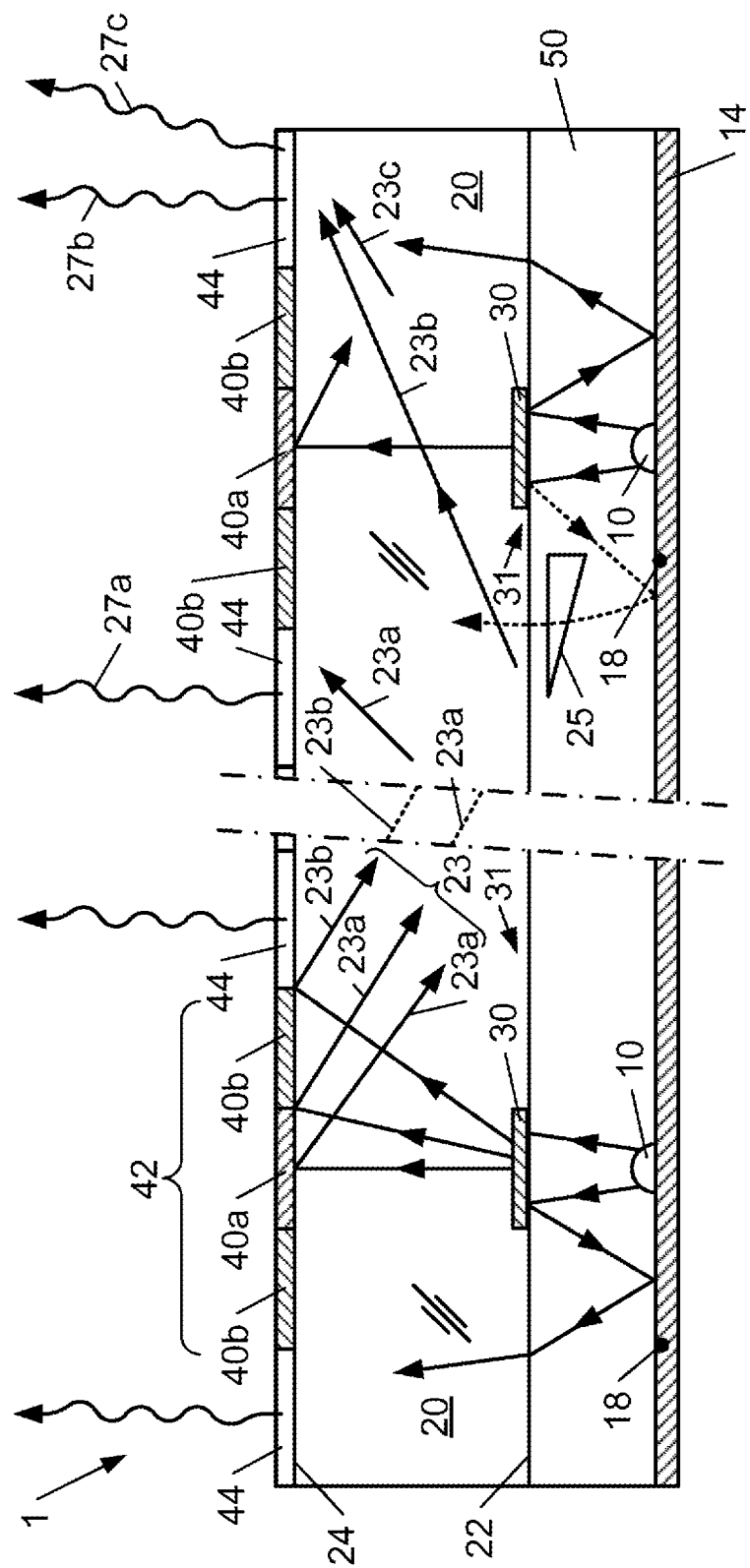
FIG. 1b illustrates a lateral cross section of a white light source comprising a reflecting substrate.

FIG. 1b shows two parts of a white light source 100 not comprising a front layer 60. FIG. 1b also illustrates 3 outcoupled light rays 27a, 27b, 27c.

For clarity the following terms are defined:

- a central portion, also defined as central part, of a light beam is defined as a symmetric portion of a light beam comprising the main axis of that light beam and the peripheral portion 12b of a light beam is defined as the remaining portion of said light beam not comprising the main axis of said light beam; As an example, the full-width half maximum emission angle (FWHM) of a light source can be used as the reference solid angle distinguishing between the central portion and the remaining portion of the light beam. For other light beams, similar statistical reference solid angles can be used to distinguish between said central and remaining, i.e. peripheral 12b, portions.
- a central axis of a light beam is defined as the symmetry axis of the light cone of said light beam, in the propagation direction of that light beam. A central light ray is defined as a light ray of said central part and a peripheral light ray is defined as a light ray of said peripheral part;
- deviation of a light beam is to be understood as a light beam undergoing a change in its propagation direction and having a deviation angle relative to the normal of a surface from which a ray leaves. Deviation may be produced by a reflection effect, a diffraction effect or a refraction effect;
- deflection is defined as the absolute difference of the angles of the propagation axis before and after the deflection. As an example, a light ray having an incidence angle of +10° and having a deviation angle of by −30°, has a deflection of +40°. An identical deflection may be obtained for any ray in a complex 3D geometry by advantageously chosen parameters of the deflection elements such as the grating shapes and periods of the light homogenizing elements.
- a homogeneous light beam is to be understood as a substantial homogeneous light beam preferably having a luminance intensity that does not vary by more than 20%, preferably more than 10% over the cross section of the homogeneous light beam, said cross section being defined perpendicular to the optical axis of said light beam, said optical axis being defined in the direction of the propagation direction of said light beam.

The array of light emitting elements, in all embodiments of the invention, is preferably a two dimensional array of light emitting elements having preferably a square, rectangular or hexagonal (honeycomb) arrangement. In order to achieve the proper luminance intensity distribution, it may be preferable to introduce irregularities in the array near its edges. The array may be a linear array of light emitting elements. Similarly, light emitting elements can be added in a non-regular pattern to allow proper white color rendition and correction, to deliver the targeted spatial and angular white light intensity distribution, and/or for thermal management purposes. The two-dimensional arrays 11 of light emitting elements 10 may be a regular distributed array of light emitting elements 10 or may be an irregular distributed array 11 of light emitting elements 10.

The distance between two adjacent light emitting elements is preferably between 5 mm and 100 mm, more preferable between 10 mm and 70 mm, more preferably between 20 mm and 50 mm.

The preferred emittance of the white light beam 100 is preferably between 0.7 and 1.8 lumens per $mm^2$, more preferably between 1.1 and 1.4 lumens per $mm^2$.

Figure 4:
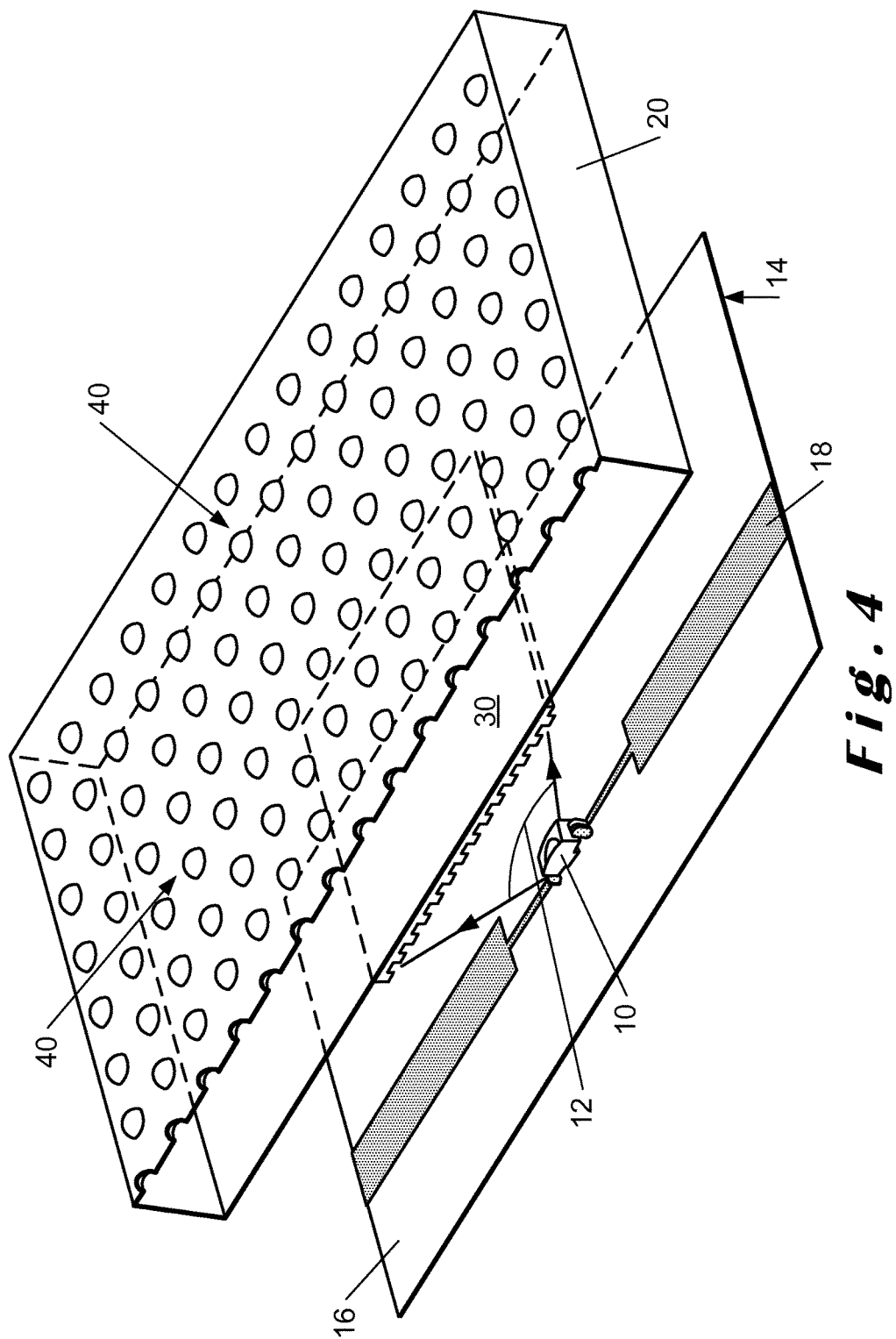
FIG. 4 shows a 3D view of a white light source comprising a reflecting substrate.

The white light source 1 of said preferred embodiment is arranged to provide a homogenuous outcoupled white light beam 100 emitted to the side of said front layer 60 opposite to said light guide 20. FIG. 4 shows a 3D view of said preferred embodiment illustrated in FIG. 1a. In order to achieve this, each of said light incoupling elements 30 faces a light emitting element 10, and the substrate 14 to which said light elements 10 are arranged, is separated from said first surface 22 by at least a gap layer 50. This gap layer 50 has an effective refractive index at least 0.2 lower than the refractive index of the light guide 20. The gap layer 50 may be an air layer. Said gap layer 50 is a layer comprising a material with a refractive index between 1 and 1.7, including 1, preferably between 1.2 and 1.6, more preferably between 1.2-1.4. In another embodiment, the gap layer 50 is substantially an air layer that will provide an effective optical cladding and a good thermal insulation with an array of contact lines, points, matrix or pillar that will structurally hold the white light source stack but that do not cover more than 10% of the light area, preferably less than 5% of the lamp area, more preferably less than 3% of the lamp area. The contact lines, points, matrices of pillars can be made of any material that are preferably transparent or highly reflecting material, scattering or not the light.

In an embodiment, said waveguide 20 comprises light redirecting elements 25 arranged to change the angular distribution of a propagating light beam 23. Said light redirecting elements 25 are defined as elements that change the propagation of at least a portion of guided light rays incident on said light redirecting elements 25. Preferably, light redirecting elements 25 are arranged in the gap layer 50 and may contribute to improve the uniformity of the white light beam. For example, said light redirecting elements 25 may direct at least a portion of partial reflected light of said divergent light beams 12 on said first surface 22 so that this portion is incoupled in said waveguide 20 under a high incoupling angle. In an embodiment said light redirecting elements comprise light reflecting elements. In an embodiment said light redirecting elements comprise light diffracting elements. Light re-directing elements 25 may also be arranged in the light guide 20. For example micro-beads may be arranged in the light guide 20. Said light redirecting elements 25 may be arranged in proximity of at least some of the light outcoupling portions of light homogenizing elements 40 and/or may be arranged in proximity of at least some light incoupling elements 30, and/or in proximity of at least some separation areas 41 and/or in proximity of at least some separation portions 31. Light re-directing elements may be grating redirecting elements, such as microprism elements or a modulation of the local refractive index.

In an embodiment said gap layer 50 comprises beam shaping elements 26 arranged between said light emitting elements 10 and said light in-coupling elements 30. As an example, said beam shaping elements 26 comprise small refractive elements such as milllimetric or sub-millimetric lenses that will shape the light beam of the light emitting elements. As an example, it may prove beneficial to substantially parallelize the divergent light beam 12 before it reaches the light incoupling elements 30.

Each of said light incoupling elements 30 is arranged to incouple in said light guide 20 a portion of said divergent light beam 12, said portion defining an incoupled light beam 21. Light incoupling elements 30 are separated by separation portions 31 and are positioned at distances at said first surface 22 such that at least a portion of the incoupled light beams 21 may undergo at least 1, but preferably at least 5 total internal reflections on said first surface 22. The portion of the incoupled light beam undergoing at least one total internal reflection defines a guided light beam 23. More preferably the number of total reflections of at least a portion of the incoupled light beams is higher than 10, in order to achieve a good light mixing and so a good homogeneity of the outcoupled white light beam 100. The portion 21 of the divergent light beam 12 that is incoupled in the waveguide 20, i.e. the portion that can propagate in total internal reflection (TIR) on non-structured area of the first 22 and second surfaces 24, is preferably at least 40%, preferable at least 55% of the divergent fight beam 12.

Figure 2:
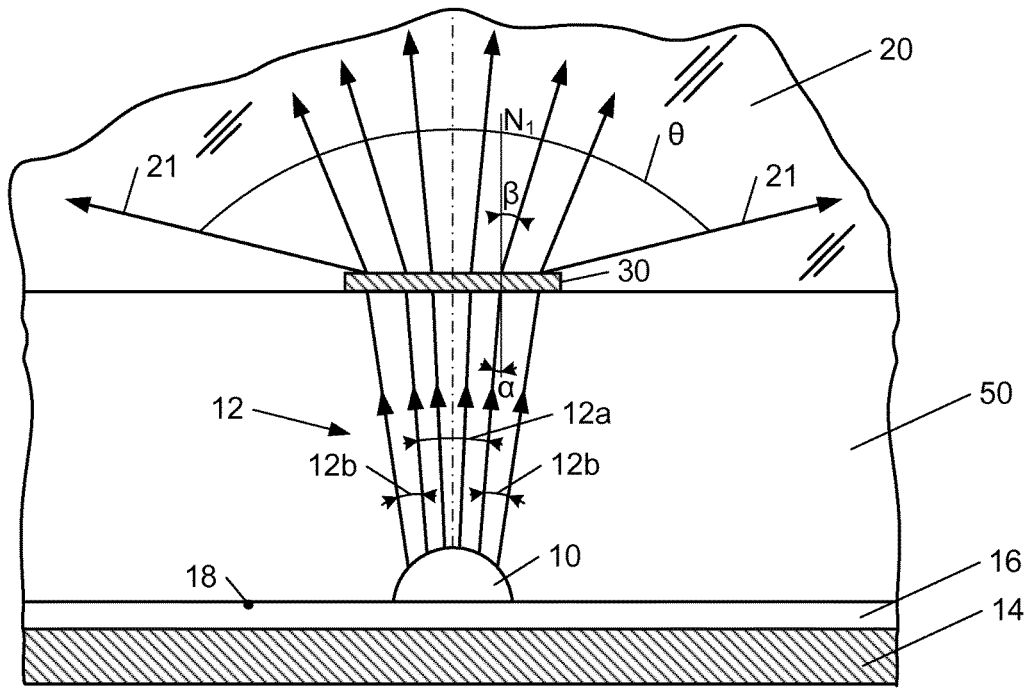
FIG. 2 illustrates the incoupling of light by a light incoupling element.

In order to achieve a homogenous white light beam 100 emitted by said white light source 1, the incoupling elements 30 and the light homogenizing elements 40 have to be arranged cooperatively so to assure the best possible mix of the in-coupled light beams 21 into said light guide. According to the invention, this is achieved by directing and spreading the in-coupled light in the waveguide 20 as much as possible in the direction of the length of the waveguide 20 in the case of a blade shaped waveguide and in all directions in the plane of said light guide 20 in all other cases. This is mainly achieved by arranging the light incoupling elements 30 so that the incoupled light beam 21 has, in the light guide 20, an aperture Θ as high as possible as illustrated in FIG. 2. Preferably the aperture Θ is higher than 90°, preferably higher than 120°, preferably higher than 150°.

Figure 1C:
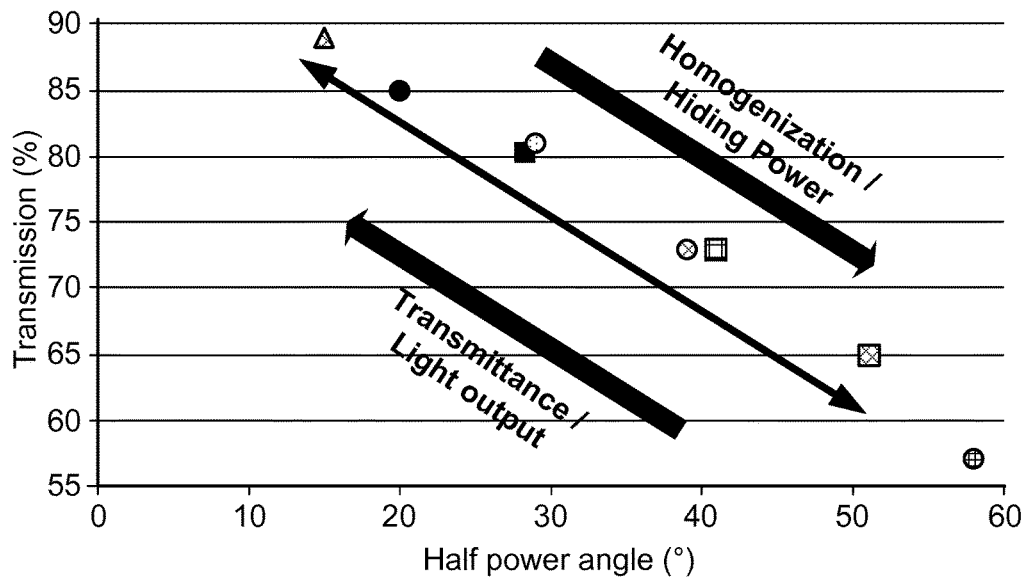
FIG. 1c is a graph showing the general relation between the hiding factor and the light efficiency of a light source

In the preferred embodiment of FIG. 1 said light incoupling elements 30 are arranged so that the incoupled angles 15 of at least a part of the light rays of said incoupled light beam 21 are higher than 45°, said incoupled angles 15 being defined relative to the normal $N_1$ of said in coupling surface 22. The incoupling of at least a portion of the divergent light beams 12 is illustrated in FIG. 2. As further explained, said incoupling elements 30 may be arranged so that the incoupling effect is higher for the central portion 12a of the incident light beam incident on said incoupling elements 30 than for the peripheral portion 12b of said incident light beam 12a so that all the light rays incident on the incoupling elements 30 are incoupled into said waveguide 20. The incoupling effect is defined as the absolute value of the proportion between the incoupled angle β and the incident, non-zero, angle α of light rays of the incident beam 12 incident on said incoupling elements 30, said incoupled angle β and the incident angle α being defined relative to the normal $N_1$ to said incoupling elements 30.

By preferably enhancing the aperture of the incoupled light beams of said central portions 12a relative to the aperture of the incoupled light beams of said peripheral portions 12b, by said light incoupling element 30, the light guiding effect in the direction of the length of the light guide 20 is enhanced and so also the homogeneity of the outcoupled light beam.

In an example, the divergent light beams of the light emitting elements 10 may have each a total aperture of 40° and a central portion 12a is defined as a light cone having a total aperture of 20°, comprising the central optical axis. In the example, light rays incident on the light incoupling elements 30 having an incident angle of 10° may have an in-coupled angle 15 of 30°, while light rays incident on the light incoupling elements 30 having an incident angle of 20° may have an incoupled angle of 40°. In this example, the aperture of the in-coupled central portion of the incident light beam in the light guide is 3 times greater than the aperture of said central portion 12a, while the aperture of the in-coupled peripheral portion of the incident light beam in the light guide is only 2 times greater than the aperture of said peripheral portion 12b. In another example, each light emitting element 10 has a substantially lambertian angular-distribution of its emitted beam 12. In this case, a typical full width half maximum angle can be about 120°, this angle defining a cone which is substantially said central portion 12a. Each of said incoupling elements 30 provides an incoupled light beam 21 of which at least a light beam portion 21a is transmitted directly, without any reflection in said light guide 20, to the light homogenizing elements 40 facing said incoupling element 30. Said light homogenizing elements 40 have preferably a greater area than the facing light incoupling elements 30. Preferably the normal $N_1$ and $N_2$ at the respective centers of said light incoupling elements 30 and said light homogenizing elements 40 are collinear.

In a variant of all embodiments of the invention, each of said light incoupling elements 30 have a substantially radially symmetry around an axis substantially coincident with each of the central axes of the divergent light beams 12. In an embodiment, a sufficient alignment registration tracking is made during the fabrication process so that the substrate and light emitting elements and the waveguide with its redirecting elements are substantially aligned. The radial symmetry is substantial but can be limited because of the alignment accuracies that may occur during the production of the white light source. The complexity of the fabrication of the incoupling elements 30 can also limit the radial symmetry of the light incoupling elements 30 by making segments of gratings in square, hexagonal, orthogonal or other polynomial shape around the central axis of the divergent light beams 12.

In an embodiment said light in-coupling elements 30 are microlens or microprisms incoupling elements. In a variant, each of the light incoupling elements 30 comprises also diffractive grating elements.

In an embodiment, said light incoupling elements 30 are grating incoupling elements. In a variant, said grating incoupling elements comprise at least two different horizontally stacked grating sub-pixels also defined as pixelated gratings. Such horizontally stacked grating sub-pixels can for example be realized as described in the document EP2447744 but other masterisation techniques, such as multiple exposures in photoresist, e-beam master writing or direct laser writing can as well be used to recombine different grating elements by the man skilled in the art. The layouts of the grating pixels and each pixel elements have numerous design possibilities and their optimization can be realized optical simulation techniques such as ray-tracing. Horizontally stacked grating design and fabrication methods are known to the man skilled in the art and are teached in, for example, the document EP2447744. All the teachings of this document can be used to design complex pixelated diffractive gratings instead of zero order gratings to obtain the overall desired coupling behavior. Example of highly efficient diffractive gratings compatible with high through-put fabrication technique are described in the documents WO2014016343 and PCT/EP2013/072659 and their teachings can be combined with the document EP2447744 by the man skilled in the art for the complex optimization of such optical couplers in order to obtain the required coupling behaviors. The documents EP2447744, PCT/EP2013/072659, and WO2014016343 are incorporated by reference in their entirety. The man skilled in the art can also design the light incoupling elements 30 with other highly efficient optical couplers such as slanted gratings, micro-optical elements, other surface of volume gratings, sometimes called holograms and pixelate them in the most appropriate way for specific designs.

To realize thin, large area, white light sources based on discrete white light emitting elements increases the complexity of the light management, as each white light emitting element will have over its lifetime a change of its emitted spectrum. Additionally the management of an array of large-spectrum divergent light sources is more complex and often less efficient than having substantially monochromatic light emitting elements. Especially in the case of diffractive optical elements, the man skilled in the art knows that their coupling efficiency is limited for large-spectral light sources if one aims to achieve long-distance light propagation in a thin waveguide, as all wavelengths cannot be diffracted simultaneously at rather flat angles. By substantially monochromatic light emitting elements, the full-width half maximum (FWHM) of the spectrum of each light emitting elements 10 is smaller than 120 nm, preferably smaller than 100 nm, more preferably smaller than 70 nm.

Additionally, as further explained, the light homogenizing elements 40 are arranged to enhance further the spreading of the incoupled light beams 21 as far as possible from the light in-coupling elements 30 providing said incoupled light beams 21. By the combined effects of said light incoupling elements 30 and said light homogenizing elements 40, the portion of the in-coupled light beam 21 that may be outcoupled from the waveguide 20 through the light homogenizing element 40 facing the incoupling element 30 that provides said incoupled light beam 21, is reduced considerably. The cooperative effects of said light incoupling elements 30 and said light homogenizing elements 40 on the incoupled light beams 21 assure that at least a portion of the in-coupled light beam 21 is transmitted in the length of said light guide 20 and undergoes at least one, preferably more than 5, preferably more than 10 total internal reflections before impinging on another light homogenizing elements as shown in FIG. 1a and FIG. 1b. This improves considerably the homogeneity of the outcoupled light beam 100 so that the individual light emitting elements 10 are not perceived by an observer positioned to the side of the white light source opposite to said light emitting elements 10.

Each light homogenizing element 40 comprises at least a light homogenizing portion 42 and at least a light outcoupling portion 44. Said at least one light homogenizing portions 42 redirect the light in the length of the waveguide 20 and said at least one light outcoupling portions 44 outcouple at least a part of the fight beam incident on said at least one light outcoupling portions 44. Light homogenizing portions 42 avoid that a large portion of the light beam is incoupled in the waveguide 20 and partially outcoupled without undergoing at least one total reflection. The redirection of the light by the homogenizing portion 42 can be realized by reflection, diffusion or oriented reflection with non-planar elements of diffraction in reflection.

Figure 3A:
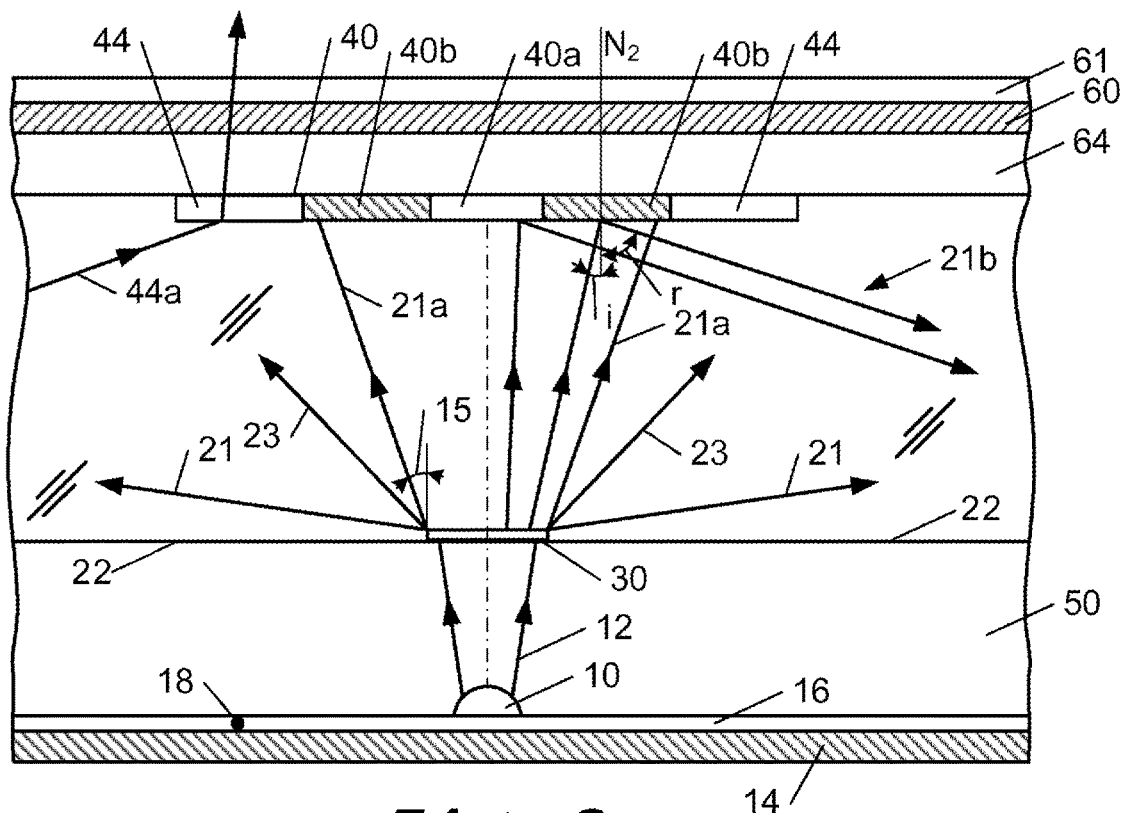
FIG. 3a illustrates the deflection of an incoupled light beam by a light homogenizing element.

FIG. 3a illustrates a light homogenizing element 40 comprising at its center a first light homogenizing portion 40a and a second light homogenizing portion 40b, each said portion having different light deviation properties. In the embodiment of FIG. 3a the light homogenizing element 40 comprises a peripheral light outcoupling portion 44. Said peripheral light outcoupling portion 44 couples out of the waveguide 22 at least a portion of a guided light beam 23 that has undergone at least one total reflection. In FIG. 3a an exemplary ray 44a provided by a distant light emitting element 10, not shown in the FIG. 3a, is outcoupled by the outcoupling portion 44.

Figure 3B:
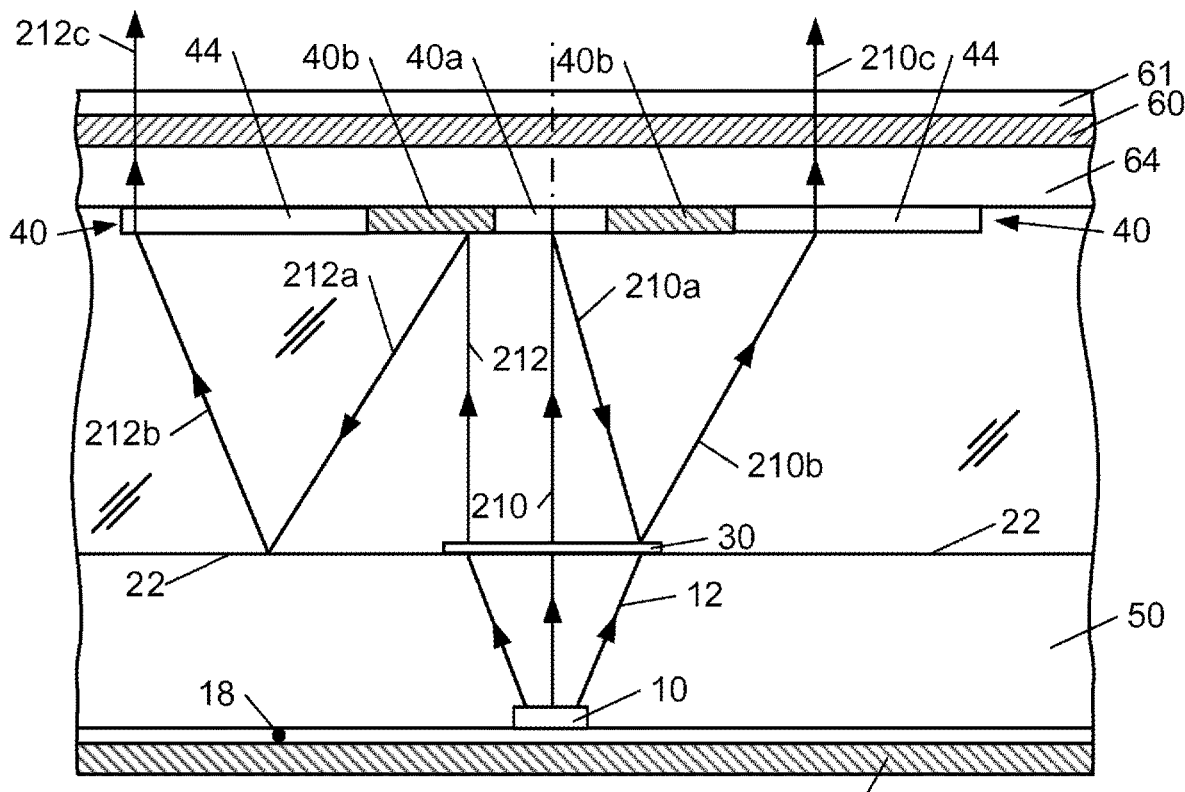
FIG. 3b illustrates the deflection of an incoupled light beam by another light homogenizing element wherein most of the incoupled light is outcoupled by a light homogenizing element facing the light element that provides the incoupled light.

In an embodiment illustrated in FIG. 3b said light homogenizing elements 40 may be arranged to outcouple a portion of a deflected fraction 21b of said incident part 21a after having undergone at least one total reflection on said first surface 22. FIG. 3b shows some specific light rays. The central light ray 210 is incoupled in the waveguide 20 and deviated by said first light homogenizing portion 40 a, providing a deviated ray 210a. This deviated ray 210a may be reflected by either the first surface 22 or by said incoupling element 30, the latter being illustrated in FIG. 3b. The reflected ray 210b is at least partially outcoupled by said outcoupling portion 44, providing an outcoupled ray 210c. Another exemplary ray 212 is incoupled and outcoupled, providing an outcoupled ray 212c.

In particular, the homogenizing effect may be achieved by arranging the light incoupling elements 30 and the light homogenizing elements 40 so that the central portions of the incident light beams on each of said light in-coupling elements 30 and said light homogenizing elements 40 are more deflected in the direction of the length of the waveguide 20 than the peripheral portions of these incident light beams, as will be described in further details. Furthermore the light coupling elements 30 are arranged to achieve the maximum possible aperture of the incoupled light beam 21.

According to the invention, said light homogenizing elements 40 are non-uniform structures arranged so that the deflection angle of at least a deflected fraction 21b of said portion 21a is higher than 45°, said deflection angle being defined as the absolute sum of the incident angle and the reflected angle of a light ray of said deflected fraction 21b, both angles being defined relative to the normal $N_2$ to said outcoupling surface 24. This is illustrated in FIG. 3. The purpose of these homogenizing elements is to statistically deflect light rays to achieve a high probability of long propagation in the waveguide by total internal reflection.

Advantageously said light homogenizing elements 40 are arranged to provide a greater deflection for incident light rays incident on the central part 40a of said light homogenizing elements 40 than for incident light rays incident on the peripheral part of said light homogenizing elements 40b, said incident light rays being light rays of said light beam 21 provided by the light in-coupling element 30 facing said light homogenizing elements 40. In an example a light ray of the central part of said portion 21a is incident on said fight homogenizing element 40 with an incidence angle i of 10° and may have deviation angle r of 50°. On the other hand, a light ray of the peripheral part of said portion 21a incident on said light homogenizing elements 40 with an incidence angle i of 20° may have a deviation angle r of 60°.

Said central part 40a may have an area less than 50% of the surface of said light homogenizing elements 40, preferably less than 30%, more preferable less than 15% of the surface of said light homogenizing elements 40.

Figure 5A:
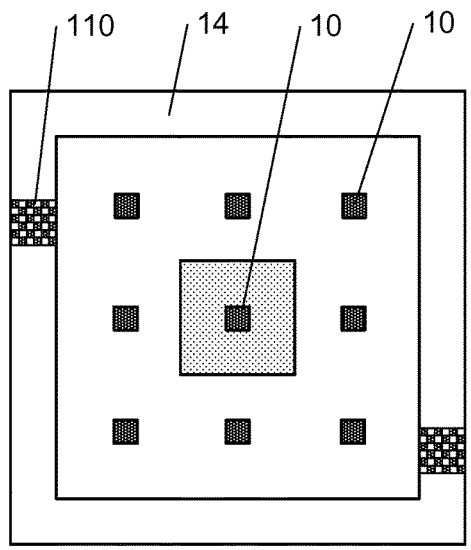
FIG. 5a shows a top view of a white light element.
Figure 5B:
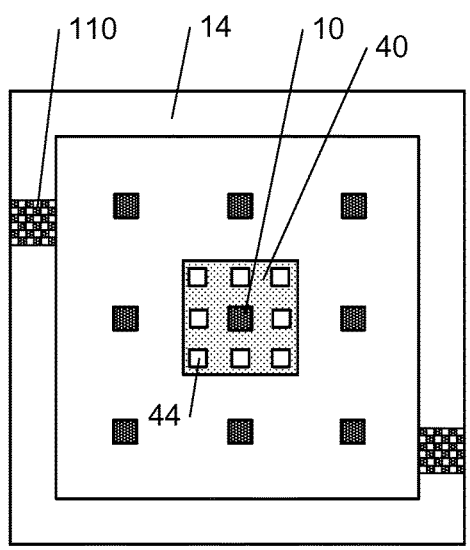
FIG. 5b shows a top view of another white light element.
Figure 5C:
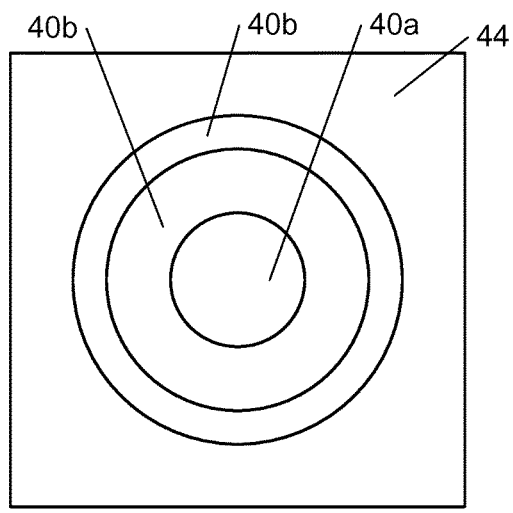
FIG. 5c shows a top view of an exemplary light homogenizing element.

Said light homogenizing element 40 has, at its center, a light homogenizing portion 42 deflecting most of the impeding light, which avoids that a significant portion of the light beam is transmitted through said waveguide 20 without at least one total reflection. A significant portion is defined as less than 10%, more preferably less than 5%, more preferably less than 3% of the impeding light that should be outcoupled by this central portion. Said light homogenizing portion 42 may be a uniformly reflecting portion. This uniform reflecting portion may be a metallic or dielectric reflector or may be a surface of volume grating reflector or a combination thereof. Said homogenizing elements 40 may comprise a plurality of outcoupling portions 44 and a plurality of light homogenizing portions 42 as illustrated in FIG. 5c.

Said light homogenizing elements 40 may have a circular cross section, or a rectangular cross section, a hexagonal cross section, an octagonal cross-section, a circular cross-section or a polygonal cross-section, said cross sections being defined in the plane of said waveguide.

The shapes of the cross sections of said outcoupling portions 44 and said light homogenizing portions 42 may be different. In an example illustrated in FIG. 5c, the light homogenizing portions 42 comprise a circular shaped central part 40a and a circular shaped peripheral part 40b and both are arranged in a rectangular shaped outcoupling portion 44.

In an embodiment, said light homogenizing elements 40 may be adjacent elements or may be separated by separation areas 41 which may comprise diffractive structures or other types of light deflecting structures. Separation areas 41 may be portions of said second surface 24 that partially reflect guided light and that may outcouple a part of the guided light out of the waveguide. Said separation areas 41 may comprise light diffusing structures.

In order to achieve the right balance between optimizing the spreading and mixing of the in-coupled light beam 21 in the direction of the length of the light guide 20 and the needed out-coupling efficiency a statistical analysis is made during the optimization of the parameters of the light guide, in particular the parameters of the light incoupling elements 30 and the light homogenizing elements 40. This can be done as an example by statistical optical simulations. Especially ray-tracing light rays emitted by one light emitting elements (approximating the array by identical cells) or ray-tracing light rays emitted by the array of light emitting elements can be done on population of rays of several millions rays. In this case, the angular distribution of the emission of the light emitting elements are used to generate the population of rays of different propagation directions and the different light redirecting, incoupling and homogenizing elements, down-converting layer are simulated for example by using transfer matrix system of look-up table that can approximate their optical behavior. With a sufficient population of light rays, the output of the thin white lamp can be predicted and optimized.

In an embodiment said light homogenizing elements 40 may be a plurality of concentric, substantially annular shaped, grating elements. In a variant, said central portion 40a is a disc shaped diffraction element and said peripheral portion 40b is an annular shaped diffraction element, both elements comprising different diffraction structures. The light homogenizing elements 40 may comprise a plurality of different shaped diffractive structures, such as for example a plurality of grating structures arranged in a chess-shaped arrangement. Said light homogenizing elements 40 may be refractive microlens arrays or may be prismatic shaped structures. Said light homogenizing elements 40 are preferably realized at the surface of the waveguide 20 and may be produced, at the same time as the incoupling elements, in for example a double-side registered roll to roll replication process. For example double-side hot embossing or nano-imprint lithography or UV-casting processes can be used to replicate master structures to the waveguide foil. Similar process can be done sheet to sheet. Each deviated light ray by said light homogenizing elements 40 going back to the waveguide undergoes at least one deviation at the first surface 22. This deviation may be a total reflection on the first surface 22, or it may be diffracted by said light incoupling elements 30 or it may be that a portion of the guided light is refracted at said first surface and is outcoupled to the gap layer 50 and may be reflected by said substrate and possibly a part of this refracted light propagating in the gap layer 50 may be re-incoupled in the waveguide 10 this latter option being not the preferable one, and then possibly to the substrate. Light rays of the guided light beam in the light guide undergo preferably at least 5 deflections by said homogenizing elements 40 and 5 deflections at said first surface 22.

Said light incoupling elements 30 are separated by separation areas 31. Said separation portions 31 are defined as the areas between said light in-coupling elements 30. In an embodiment said separation portions 31 may comprise further outcoupling elements 32, also defined as additional structural elements that may further improve the light mixing effect of the guided light beams in the waveguide 20. For example, said additional structural elements may be diffractive elements or prismatic structures or a cladding or a reflective element. Said further elements may be diffractive lens structures.

In the preferred embodiment of FIG. 1a and the embodiment of FIG. 1b the light homogenizing elements 40 cover more than 60% of the area of the second surface 24, preferable more than 80%, more preferably more than 90%. These possible coverage apply also for all the embodiments of the inventions.

In all the embodiments of the invention, the light homogenizing elements 40 cover more than 3 times, preferably more than 10 times and more preferably more than 20 times the surface covered by the light incoupling elements 30. The light homogenizing elements 40 may have any shape defined in the plane of the second surface 24. For example the cross section areas of the light homogenizing elements 40 defined in the plane of said second surface may be rectangular or square shaped elements or they may be circular shaped elements.

In the preferred embodiment of FIG. 1a the light homogenizing elements 40 are identical light homogenizing elements 40.

Depending on the desired geometry and the light homogeneity there may be an interest in using non-identical light homogenizing elements 40 and non-identical light in-coupling elements 30, for example in the case wherein the light homogeneity at the border of the white light source 1 has to be improved, for example due to unwanted reflections provided by the edge of the light guide 20. In a variant the array of light homogenizing elements 40 may comprise at least two different light homogenizing elements 40. In a variant this may also be the case for of the array 30a of light in-coupling elements which may comprise preferably identical elements or also different light in-coupling elements. In the case that the array 30a of light in-coupling elements and the array of light homogenizing elements comprise non-identical elements there is no limit in the number of alignment combination possibilities of a light homogenizing element 40 facing a light in-coupling element 30. Various light homogenizing elements and light incoupling elements may especially be needed if substantially monochromatic light emitting elements of various colored and incorporated in the array.

The light homogenizing elements 40 are arranged to couple out of the light guide an out-coupled fraction of the guided light in the light guide. This out-coupled fraction is preferably more than 70% of the total guided light in the light guide, preferably more than 80%, more preferably 90%.

Said light guide 20 is preferably a thin and flexible sheet, preferably rectangular and is made of a material substantially transparent to visible light, for example a plastic material such as PMMA, PC, PET, PS, optical silicone, a glass material or an optically clear composite material. The waveguide has preferably a rectangular shape, in the plane of the waveguide 20 and has an area, defined in the plane of the waveguide 20, of preferably greater than $10 \times 10$ cm$^2$, preferably greater than $60 \times 40$ cm$^2$, preferably greater than $100 \times 100$ cm$^2$ In the case that the light guide 20 has an arbitrary shape (for example circular, elliptical, hexagonal), defined in the plane of the waveguide its area is preferably larger than 100 cm$^2$, preferably larger than 400 cm$^2$ more preferably larger than 2'500 cm$^2$.

Said light in-coupling elements 30 and said light homogenizing elements 40 may be realized directly at respectively the first and second surface of said light guide 20, for example by surface topography replication methods and coating methods, such as but not limited to printing, sputtering and evaporation. Said light in-coupling elements 30 and said light homogenizing elements 40 may be adapted to said light guide 20, for example by adding a structured film to each side of said light guide.

In the preferred embodiment of FIG. 1a a front layer 60 is arranged to said light guide 20. This front layer 60 is a layer that converts the incident ultra-violet, violet or blue light beam on that layer 60 to a white light beam. The front layer 60 may be a wavelength up-conversion layer 61 arranged directly, for example by deposition techniques, on said second, out-coupling, surface 24. In a variant said wavelength up-conversion layer 61 may be arranged inside said light guide 20. Wavelength up-conversion layers 61 are well known and will not be further explained here.

In said preferred embodiment comprising ultra-violet, violet or blue light emitting elements, said front layer comprises at least a wavelength up-conversion layer 61; Wavelength up-conversion is defined as a shift, by said wavelength up-conversion layer, of the wavelength from shorter to longer wavelengths. In an embodiment comprising ultra-violet, violet or blue light emitting elements, said wavelength up-conversion layer is embedded in said waveguide, in proximity to said second surface. In another embodiment said front layer comprises at least phosphorescent molecules; Said front layer may comprise fluorescent or phosphorescent molecules or aggregates of molecules, such as macromolecules, spatially patterned semiconductors or quantum dots; In an embodiment, said front layer 60 is a structured layer, preferably a patterned layer comprising a plurality of structured patterns which may provide a structured appearance of the emitting area of the white light source to an observer.

A wide variety of variants of said front layer 60 is possible. The front layer 60 is a substantially flat layer or sheet and must not have the same cross sectional shape, defined in its plane, as the cross sectional shape of the surface to which it is arranged. For example the front layer 60 may be a circular shaped front layer arranged to a rectangular second surface 24, said second surface 24 having a smaller area than said front layer. The front layer can be non-monolithically integrated with the thin white light lamp, and may be, for example, being integrated to a lamp housing. This allows to have it exchangeable or to release the thermal constraint on this front layer.

In all embodiments of the invention a front layer 60 may be arranged. A front layer 60 comprising different types of layers and structures, as further described, and may be adapted to said light, guide 20 to obtain several effects on the white light beam 100. For example, a front layer 60 may be used to realize different white light sources 1 having different shades of the provided white fight beam 100. A front layer 60 may further improve the homogeneity of the provided white light beam 100. A front layer 60 may also comprise structures and/or elements so that a textured appearance of the white light source 1 is perceived by an observer. The structuring of said front sheet 60 may be realized so as to provide a white light source 1 having the appearance of a structured ceiling tile.

In all the embodiments comprising a front sheet 60, said front sheet 60 may be adapted to an outcoupling surface in different ways. For example a front sheet may be glued to an outcoupling surface or may be separated by an out-coupling surface by spacers.

In the preferred embodiment of FIG. 1a, said front sheet 60 may be arranged to a distance to said second surface 24 by a spacing layer 64 and may be separated from said second surface 24 by a plurality of structural contacts also defined as spacers, said spacers may be pillar-shaped structures. The spacing layer 64 between said second surface 24 and said front layer 60 has a thickness of preferably between 0 mm and 5 mm, preferably between 0 and 2 mm and may be 0 mm. The same thickness value ranges are possible for all embodiments of the invention comprising front layers 60 arranged to an out-coupling surface of the white light source 1.

In the preferred embodiment of FIG. 1a said front layer 60 is made of a material that is transparent for blue light is a wavelength up-conversion layer 61 is arranged on said front sheet 60 to the opposite side of the incident blue light. If the wavelength up-conversion layer is arranged on said front sheet to the side of said second surface 24, said front sheet 60 may be made of any material that is transparent for white light. Said front layer 60 may also comprise a wavelength up-conversion layer or wavelength up-conversion elements imbedded in said front sheet.

Said front layer 60 may comprise several layers and may comprise a layer or materials that absorb wavelengths in the ultraviolet wavelength range that can have negative impact on human vision and eyes, for example the wavelengths smaller than 380 nm or the wavelengths smaller than 400 nm. This may be useful to reduce potential damaging effects to the eyes produced by short wavelength light that may be captured by the eyes of an observer.

For example said front layer 60 may be a plastic sheet comprising, on at least one of its surfaces, a wavelength up-conversion layer 61.

In the preferred embodiment of FIG. 1a, the substrate layer 14 is a reflecting substrate and may comprise a highly reflecting layer 16, for example a reflecting coating layer. The effect of this reflecting substrate 14 is to redirect to the light guide 20 partial reflected light of the emitted light beams 12 incident on said first surface 22 or on other elements of the waveguide or front layer, so that this light rays can be send back to the waveguide 20 and being incoupled. This is illustrated in FIG. 1 brand FIG. 5d.

The substrate is preferably highly reflecting or highly transparent. In the first embodiment, the light incident on it can be recycled by scattered or non-scattered reflection so that statistically it can reach a light incoupling of element 30 and be incoupled in the waveguide. Despite optimized incoupling 30 and light homogenizing 40 elements, it can be expected that a fraction of the light emitted by the light source 10 will be redirected to the substrate. Such statistical light reflection, or photon recycling, aims at improving the efficiency and homogeneity of the white lamp 1. It is expected that all rays or photons cannot be incoupled in the waveguide 20 because of the area occupied by of the light emitting elements 10 and by conductive lines 18, but advantageously the recycling of partial reflected light at least on said first surface 22 is maximized. On the opposite, if the flat white lamp 1 should emit in both direction substantially perpendicular to said first surface 21 and said second surface 24, the substrate is highly transparent. Highly transparent being defined as having a transmissions higher than 70% for visible light wavelengths, preferably higher than 80%, preferably higher than 90%.

Figure 5D:
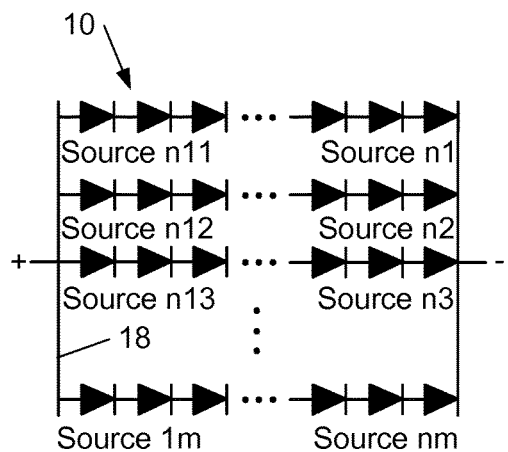
FIG. 5d shows a lay-out of the electrical connections between light emitting elements.

The substrate 14 comprises at least two conducting wires 18 to provide electricity to said light emitting elements 10 and the substrate 14 and the conducting wires 18 are arranged to reduce the heat generated by the light emitting elements 10. Different configurations of conducting wires 18 may be arranged to said substrate 14. FIG. 5d shows a typical layout of the interconnection of said light elements 10 with conducting wires 18 The light sources 10 can be connected following a combination of series/parallel electrical connections, and in the case of a square pattern, the light sources in the same row (column) are electrically driven in series whereas the different rows (columns) are electrically driven in parallel as shown in FIG. 5d.

In an embodiment said light array 11 comprises an array of red, blue and green intertwined light emitting elements 10. Preferably all light emitting elements 10 are LEDs but may be different types of light emitting elements, for example VCEL arrays. The red, blue and green light emitting elements 10 are arranged so that each red light emitting element has at least a neighboring green light emitting element and at least a neighboring blue light emitting element. In the embodiment, of which a partial view is illustrated in FIG. 1b, said array 11 of light emitting elements red, green and blue light emitting elements and has preferably no wavelength up-conversion layer 61 arranged in the white light source. Indeed, arranging a combination of substantially blue, green and red light emitting elements 10 is sufficient to produce ad emit a white light beam. However, a wavelength up-conversion layer 61 could be beneficial to improve the spectral coverage of the lamp. The light in-coupling elements 30 facing the light emitting elements 10 couple into said light guide 20 the light beams provided by the red, green and blue light emitting elements. This in-coupled red, green and blue light beams are deflected, spread and mixed in a similar way to the guided light beams of the embodiment comprising blue light elements. The out-coupled fractions of the guided red, green and blue light beams provide a homogeneous out-coupled white light beam 100. As described before, a front sheet 60 may be arranged to the second, out-coupling, surface 24. In a variant comprising red, blue and green light emitting elements 10 said front sheet 60 may be a colored front sheet and may comprise a diffusing layer 62. A colored front sheet may be useful to provide a light beam having different shades of white. In all embodiments of the invention in which a front sheet is arranged, said front sheet need not be a homogeneous front sheet and may have different optical characteristics over its surface, for example it may be a substantial transparent layer comprising a central part that absorbs more light than the peripheral part of the front sheet.

In an embodiment of the white light source comprising red, blue and green light emitting elements, illustrated in FIG. 1b, the white fight source 1 has no front sheet 60. The incoupled portions of the incident red, green and blue divergent light beams are propagated as in the embodiment of FIG. 1b and portions of the guided red, green, blue incouped beams are deflected by said light homogenizing elements 40 and at least partially outcoupled by the light outcoupling portions 44 of said light homogenizing elements 40. The incoupling structures and the light homogenizing elements are arranged so as to provide a white light beam 100, which is an addition of the plurality of outcoupled red, green and blue light beams. In order to obtain a particular shade of white, the incoupling elements 30 and the light homogenizing elements 40 facing the red light emitting elements may be different than those facing the green and/or blue light emitting elements. As further explained a light sensor may be arranged to the white light source, and said light sensor may drive differently said red, green and blue light emitters. For example, the current of the red light emitters may be adapted so that the red light intensity is increased so that the white light spectrum is slightly shifted to the red part of the spectrum.

There is a wide range of possibilities to arrange the individual red, blue and green light emitting elements 10 on said substrate 14. In a variant, the individual red, blue and green light emitting elements 10 are arranged according to a hexagonal configuration. It another variant the light emitting array 10a comprises parallel lines of red, blue and green light emitting elements 10. In a variant, red, blue and green light emitting elements 10 may be arranged in concentric circles.

In an embodiment of the invention, said gap layer 50 comprises beam shaping elements 26 arranged between said light emitting elements 10 and said light in-coupling elements 30.

In an embodiment light redirecting elements 25 are arranged between adjacent divergent light beams. In an embodiment said light redirecting elements 25 comprise scattering elements. In an embodiment said light redirecting elements comprise light reflecting elements. In an embodiment said light redirecting elements comprise light diffracting elements. In an embodiment said light redirecting elements comprise light refracting elements.

Figure 9:
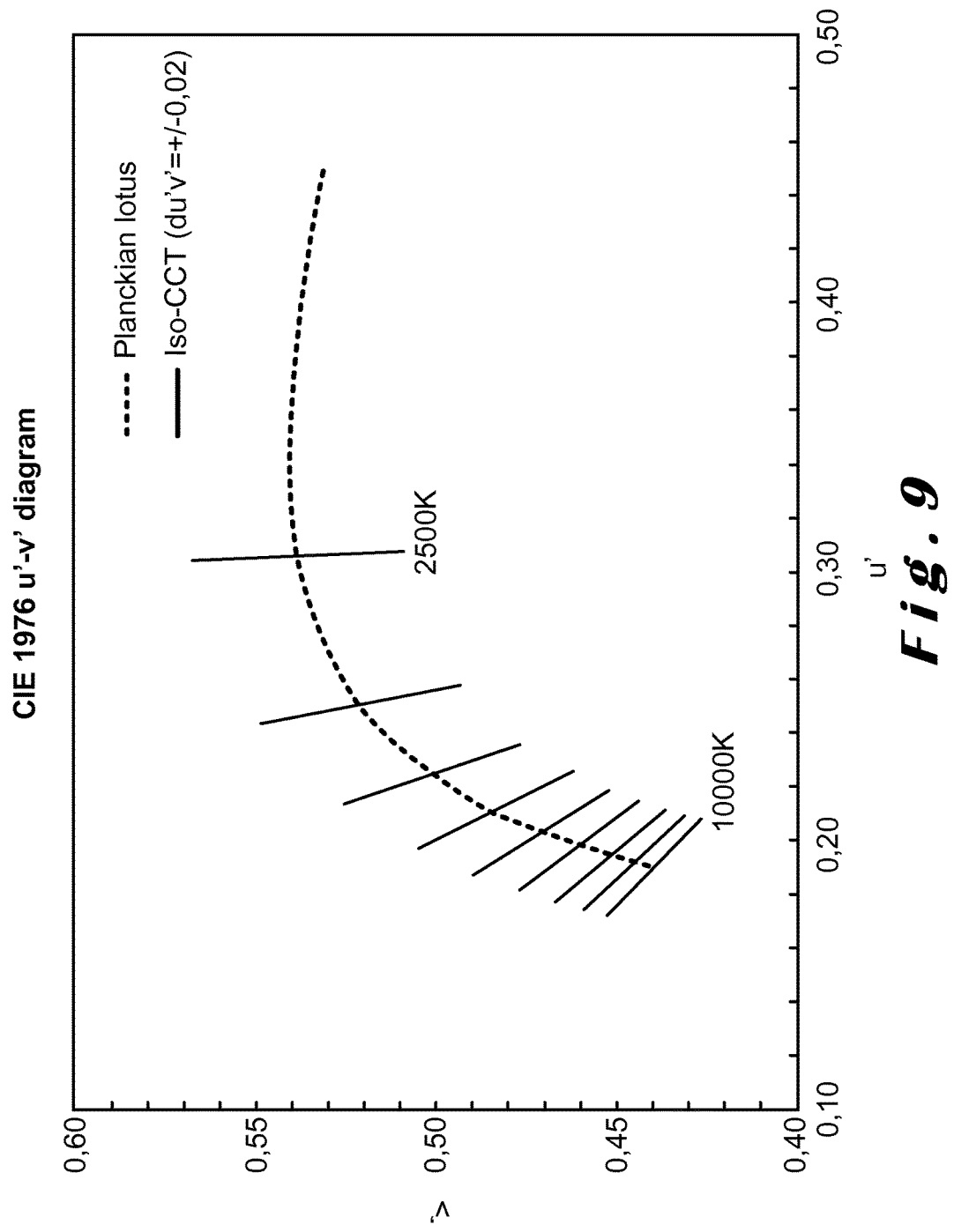
FIG. 9 shows a CIE 1976 color diagram.

In all the embodiments of the invention the white light is defined in terms of the so-called Correlated Color Temperature (CCT) expressed in Kelvin and corresponding to the color of the light emitted light by a blackbody in thermal equilibrium at the specified temperature (Planckian locus). FIG. 9 shows the corresponding CIE 1976 color diagram.

In all embodiments of the invention, the white light has a CCT between (2'500-10'000) Kelvin, more preferably between (2'700-6'500) Kelvin. Any given CCT in the mentioned range can be represented by two coordinates (u', v'). This is shown in FIG. 9. In all embodiments, the distance (du', dv') between the Planckian locus and the (u', v') coordinates of the white light is lower than 0.02, preferably lower than 0.005, more preferably, lower than 0.0002.

Said white light source may be arranged to provide a white light beam 100 to the side of the light guide 20 opposite to the array of light emitting elements and provide an additional white light beam 102 emitted to the side of the light guide 20 opposite to said second surface 24. This is illustrated in FIG. 6.

In the embodiment of FIG. 6, the substrate layer 14 is a transparent layer. In the embodiment of FIG. 6 said light incoupling elements 30 and light homogenizing elements 40 are arranged to out-couple the guided light partially through said first surface 22 and partially through said second surface 24. This may be achieved by arranging at least said light incoupling elements 30 and said light homogenizing elements 40. In the embodiment of FIG. 6 the design of said light incoupling elements 30 and said light homogenizing elements 40 is made in function of the desired light intensities and homogeneity of the provided white light beam 100 and the provided additional white light beam 102.

Preferably, the white light beam 100 and additional white light beam 102 have substantially the same average intensities and/or substantially the same homogeneity, but this must not be so necessarily. In order to improve the light intensity of the additional white light beam 102, additional structural elements 32 may be arranged to the separation areas 31 in order to enhance the light mixing effect. When needed, said additional structural elements 32 may also assure that said additional white light beam 102 has substantial identical optical properties as the white light beam 100, as well relative to the intensity as the homogeneity of the white light beams 100 and 102. In a variant of the embodiment of FIG. 6, a similar front layer 60 as the one described of the front layer 60 that may be arranged to the variants of the embodiment of FIG. 1a is arranged to the side of the transparent substrate 14 and positioned opposite to said first surface 22. FIG. 6 illustrates a front layer comprising a light diffusing layer 62.

In an embodiment, the front layer 60 may be arranged to one side of said light guide 20 and a second front layer may be arranged to the light guide, to the opposite side of said front layer 60. Said front layer 60 and said second front layer may be similar front layers or may be different front layers. For example said front layer 60 may comprise a diffusing layer and said second front layer may comprise a structured layer. In this example, the white light source has a uniform white appearance seen from one side and has a structured white appearance to the other side.

When the light emitting elements 10 in the embodiment of FIG. 6 are blue light emitting elements, a wavelength up-conversion layer 61 needs to be arranged in said white light source, similar to the one described in the embodiment of FIG. 1a, and this wavelength up-conversion layer may be arranged inside said light guide or arranged to a front layer adapted to said substrate 14 as illustrated in FIG. 6. In a variant of FIG. 6, based on blue light emitting elements, said wavelength up-conversion layer 61 is arranged to at least one of the sides of said transparent substrate 14. In a variant, said wavelength up-conversion layer 61 is a discontinuous layer of which the portions are arranged on said separation portions 31.

Figure 7:
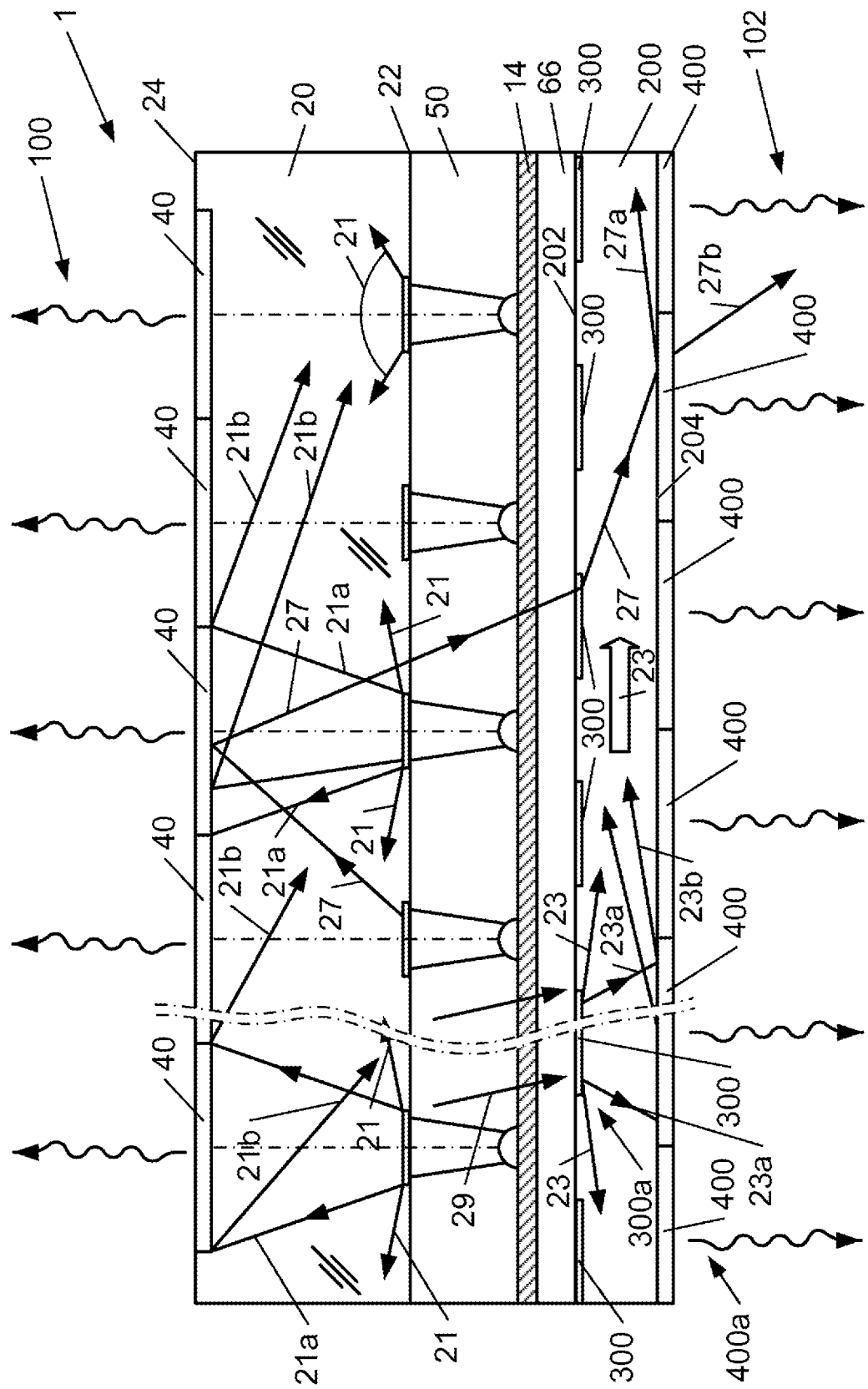
FIG. 7 shows a white light source comprising two light guides.
Figure 8:
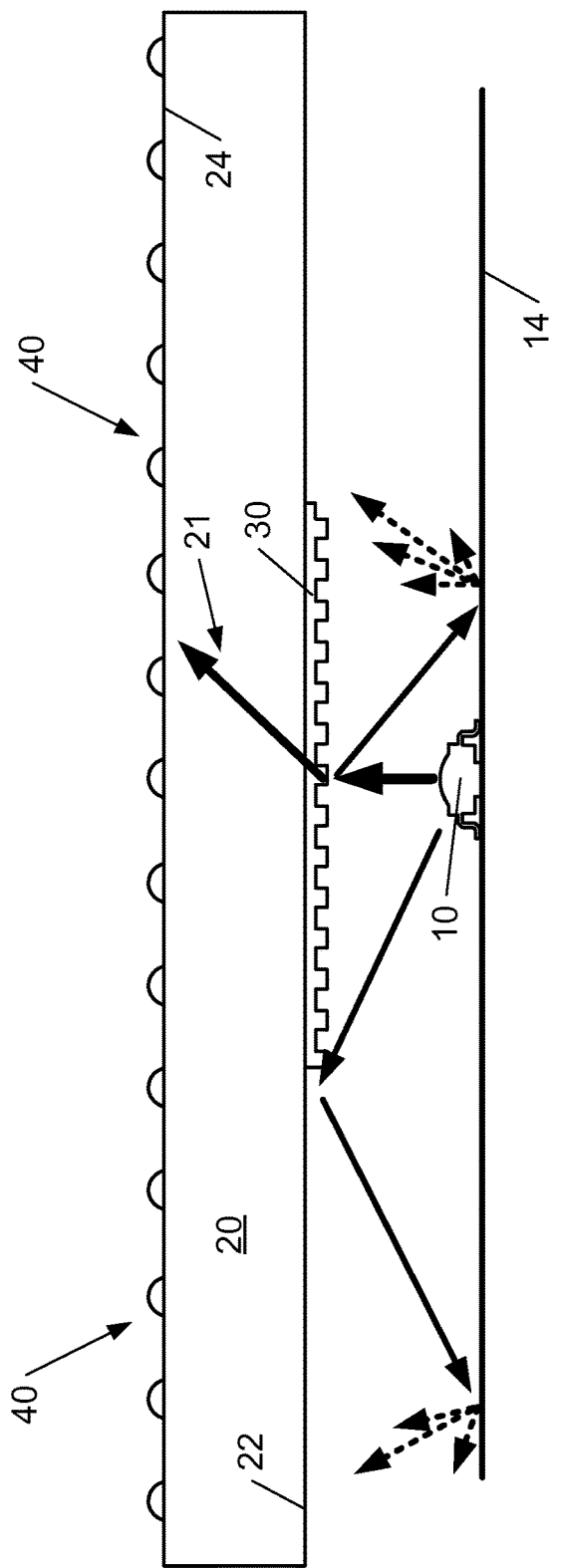
FIG. 8 shows a partial reflection of an emitted light beam on a light incoupling element and the reflection on a reflecting substrate.

In an embodiment of the white light source to further improve the luminance homogeneity of a white light source 1 that provides to each side of said light guide 20 a white light beam 100 and 102, a second light guide 200 may be arranged to said transparent substrate 14, as shown in FIG. 7. Said second light guide 200 comprises a second array 300a of second light in-coupling elements 300 and second array 400a of second light homogenizing elements 400. A portion of the guided light beams 21 is outcoupled through said first surface 22 and provides a plurality of out-coupled light beams 29 to said second light in-coupling elements 300. FIG. 7 shows a typical light ray 27 that is incoupled in said second light guide 200 and is outcoupled by said second light homogenizing elements 400. Similar to the embodiment of FIG. 1a and FIG. 1b said second light homogenizing elements 400 comprise at least a light homogenizing portion and at least an outcoupling portion. As said plurality of outcoupled light beams 29 have different light beam properties than the ones of the emitted light beams 12, said second light in-coupling elements 200 and second light homogenizing elements 400 are preferably different types or different structured elements than said light in-coupling elements 30 and light homogenizing elements 40. For example, said light incoupling elements 30 may be diffractive gratings while said second light incoupling elements 300 may be microprism arrays. In another example said light homogenizing elements 40 may be diffractive gratings while said second light homogenizing elements 300 may be different gratings than the ones that constitute said light homogenizing elements 40.

In an embodiment of the white light source of FIG. 7, and similar to the variants of the embodiments of FIG. 6, at least one front sheet may be arranged to at least one of the sides of said white light source. In the case that blue light emitting elements are used in the white light source, at least one wavelength up-conversion layer 61 is arranged in said white light source.

In an embodiment of the white light source of FIG. 7, comprising blue light emitting elements, a first wavelength up-conversion layer is arranged to said second surface 24 and a second wavelength up-conversion layer is arranged to said fourth surface 204.

In an embodiment of the white light source of FIG. 7, comprising blue light emitting elements, a first front layer comprising a wavelength up-conversion layer similar to first layer 60 and wavelength up-conversion layer 61 shown in FIG. 1a may be arranged to said second surface 24 and a second front layer comprising a wavelength up-conversion layer may be arranged to said fourth surface.

In a further embodiment of the white light source of FIG. 7, a second front layer comprising a wavelength up-conversion layer may be arranged to said fourth surface 204, to the side away from said substrate 14. In a variant a second wavelength up-conversion layer may be imbedded in said second light guide 200 in proximity to said fourth surface 204.

It is generally understood that the wavelength up-conversion layers in the invention may comprise fluorescent molecules and/or phosphorescent molecules. It is also understood that a wavelength up-conversion layer may be imbedded in said light guide 20 by doping technique or be added into or onto said light guide by laminating a layer comprising fluorescent molecules and/or phosphorescent molecules.

In all the embodiments of the invention a light sensor 110 may be arranged in said white light source 1.

A fight sensor 110 detects the light intensity and spectral distribution of the out-coupled light and provides an electrical signal that may be used to adapt the intensity levels of at least a part of said light emitting elements 10. A light sensor may be an array of light sensors 110 comprising light sensor elements that are positioned at different places in said white light source 1. Preferably, said light sensor 110 is arranged inside the light guide 20, or in said gap layer 50, or in proximity or on an out-coupling surface or in proximity or on a front sheet. In the case of an embodiment using red, green and blue light emitting elements 10, a light sensor 110 or light sensor elements may be adapted to control the light emission by the red, green and blue light emitting elements 10 in order to provide different shades of white light.

It is also understood that the white light source comprises means to tune the spectral composition of said white light beam 100. Said means may be, but not limited to:
- using different types of red and/or green, and or blue light emitting elements in the array 11 of light emitting elements 10;
- using a plurality of light sensors, each of said light sensor being electrically connected to one type of light emitting elements and being arranged to adapt the light intensity output of at least one array 11 type of light emitting elements 10.
- electronic circuits that may modulate, in frequency and/or in amplitude, at least a portion of at least one type of light emitting elements 10.

It is also understood that a combination of said means to tune the spectral composition of said white light beam 100 is possible.

Furthermore it is understood that in all embodiments of the invention at least one light diffusing layer may be adapted to at least one surface of the white light source. For example a light diffusing layer may be arranged to one side of a front sheet 60 and a wavelength up-conversion layer 61 may be arranged to the opposite side of said front sheet. Said light diffusing layer may be a non-continuous layer arranged on a fraction of said front sheet, or any other surface of said white light source, for example said second surface 24 and/or said fourth surface 204.

It is understood that the white light source 1 may be adapted such as to provide a white light beam 100 whose properties may be varied as a function of different parameters. Non exhaustive examples of these parameters are the time, the environment of the light source such as the persons in its proximity or its ambient lighting conditions, the place where the light source is fixed, the electrical or energy grid demand (dynamic energy demand) or the aging of the white light source 1.

The invention claimed is:

1. A white light source comprising an array of non-white light emitting elements each of said light emitting elements being arranged to provide, in operation, a divergent light beam, said array of light emitting elements being arranged to a light guide comprising at least a first surface and a second surface facing said first surface,
wherein:
said light emitting elements are arranged on a substrate comprising at least one electrical conducting wire connected to said light emitting elements;
at least a light incoupling array comprises light incoupling elements arranged on said first surface, each of said light emitting elements facing a light incoupling elements;
said substrate being separated from said first surface by at least a gap layer;
said gap layer having an effective refractive index at least 0.2 lower than a refractive index of the light guide;
each of said light incoupling elements being arranged to incouple in said light guide a portion of said divergent light beam, said portion defining an incoupled light beam, said incoupling elements being further arranged so that an incoupled angle of at least a part of the light rays of said incoupled light beam are higher than 45°, said incoupled angles being defined relative to a normal ($N_1$) of said first surface;
at least an array of light homogenizing elements is arranged on said second surface, each of said light homogenizing elements facing a light incoupling element, said light homogenizing elements being non-uniform structures arranged so that a deflection angle of at least a fraction of the incident part of said incoupled light beam incident on each of said light homogenizing elements is higher than 45°, said deflection angle being defined as an absolute sum of an incident angle and a reflected angle of a light ray of said incident part, both angles being defined relative to a normal ($N_2$) of said second surface;
said white light source being arranged to provide at least a uniform outcoupled white light beam emitted to at least the side of said light guide opposite to said first surface.

2. The white light source according to claim 1, wherein said substrate is a highly reflecting substrate, reflecting at least 80% of visible light, and comprising at least a highly reflecting area facing said first surface.

3. The white light source according to claim 2, wherein a front layer is arranged to said light guide and faces said second surface.

4. The white light source according to claim 3, wherein said front layer comprises a wavelength up-conversion layer.

5. The white light source according to claim 2, wherein a wavelength up-conversion layer is arranged inside said light guide and in proximity to said second surface.

6. The white light source according to claim 4, wherein said array of light emitting elements comprises at least an array of light emitting elements emitting light in at least a portion of the wavelength spectrum between 380 nm-480 nm.

7. The white light source according to claim 6, wherein said array of light emitting elements comprises red and green light emitting elements, and wherein the light emitting elements emitting light in at least a portion of the wavelength spectrum between 380 nm-480 nm emit more than 80% of an optical power emitted by said array of light emitting elements, said white light source comprising a tuning element to tune a spectral composition of said white light beam.

8. The white light source according to claim 1, wherein said array of light emitting elements comprise at least a first array of red light emitting diodes, a second array of green light emitting diodes and a third array of blue light emitting diodes, said first, second and third arrays are intertwined.

9. The white light source according to claim 6, wherein said front layer comprises at least a diffusing layer.

10. The white light source according to claim 6, wherein said front layer comprises a colored layer.

11. The white light source according to claim 6, wherein said front layer is a patterned layer comprising at least a plurality of structured patterns.

12. The white light source according to claim 1, wherein said light incoupling elements are diffractive grating incoupling elements.

13. The white light source according to claim 12 wherein said grating incoupling elements comprise at least two different grating elements being substantially radially symmetric around an optical axis of each of said light emitting elements.

14. The white light source according to claim 12, wherein each said grating incoupling elements is arranged in an array of homogenous pixels having a spatial period smaller than 1000 nm.

15. The white light source according to claim 12, wherein each of said grating incoupling elements is coated with a thin layer of high refractive index, said layer thickness being less than 300 nm, said refractive index being higher than 1.65.

16. The white light source according to claim 1, wherein said light incoupling elements are micro lens or micro prisms incoupling elements.

17. The white light source according to claim 1, wherein further light coupling elements are arranged between said light incoupling elements.

18. The white light source according to claim 1, wherein light incoupling elements cover less than 50% of said first surface.

19. The white light source according to claim 1, wherein said light homogenizing elements are micro lens or micro prisms incoupling elements.

20. The white light source according to claim 1, wherein said light homogenizing elements are non-uniform and substantially radially symmetric around an axis collinear with an optical axis of each of said divergent light beams.

21. The white light source according to claim 1, wherein each of said light homogenizing elements is adjacent light homogenizing elements, and a total area of said light homogenizing elements is greater than 60% of an area of said second surface.

22. The white light source according to claim 1, wherein said light homogenizing elements are separated by separation areas.

23. The white light source according to claim 1, wherein each of said light incoupling elements is arranged so that a total incoupled angle of the light rays of a central part of each of said divergent light beams on said light incoupling elements is greater than for light rays of a peripheral part of the divergent light beam on said light incoupling elements.

24. The white light source according to claim 1, wherein said light guide has a thickness between 0-5 mm.

25. The white light source according to claim 1, wherein said gap layer has a thickness between 0-2 mm.

26. The white light source according to claim 1, comprising a light spectral sensor element adapted to analyze an emitted spectrum of the white light source in order to correct or adapt a white light spectral distribution.

27. The white light source according to claim 1, wherein at least a portion of said grating incoupling elements and/or at least a portion of said light homogenizing elements are coated with a thin layer of high refractive index, said thin layer having a thickness being less than 300 nm, said refractive index being higher than 1.65.

* * * * *

UNITED STATES PATENT AND TRADEMARK OFFICE
CERTIFICATE OF CORRECTION

PATENT NO. : 10,534,123 B2
APPLICATION NO. : 15/549373
DATED : January 14, 2020
INVENTOR(S) : R. Ferrini et al.

It is certified that error appears in the above-identified patent and that said Letters Patent is hereby corrected as shown below:

| Column | Line | |
|---|---|---|
| 22 | 6, 7 | Claim 1, "incoupling elements;" to -- Incoupling element; -- |

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*